US012651927B2

(12) United States Patent
Feng et al.

(10) Patent No.: US 12,651,927 B2
(45) Date of Patent: Jun. 9, 2026

(54) WIRELESS CHARGING SYSTEM

(71) Applicant: Huawei Technologies Co., Ltd.,
Shenzhen (CN)

(72) Inventors: Shaojie Feng, Dongguan (CN);
Zhiqiang Zeng, Dongguan (CN);
Yongfa Zhu, Dongguan (CN); Jin Qiu,
Shenzhen (CN)

(73) Assignee: Huawei Technologies Co., Ltd.,
Shenzhen (CN)

( * ) Notice: Subject to any disclaimer, the term of this
patent is extended or adjusted under 35
U.S.C. 154(b) by 662 days.

(21) Appl. No.: 17/703,709

(22) Filed: Mar. 24, 2022

(65) Prior Publication Data

US 2022/0216734 A1 Jul. 7, 2022

Related U.S. Application Data

(63) Continuation of application No.
PCT/CN2020/096397, filed on Jun. 16, 2020.

(30) Foreign Application Priority Data

Sep. 25, 2019 (CN) .......................... 201910913196.6

(51) Int. Cl.
*H02J 50/12* (2016.01)
*H02J 7/00* (2026.01)
(Continued)

(52) U.S. Cl.
CPC ................ *H02J 50/12* (2016.02); *H02J 7/70*
(2026.01); *H02J 50/005* (2020.01)

(58) Field of Classification Search
CPC .......... H02J 50/005; H02J 50/12; H02J 50/40;
H02J 7/0042
See application file for complete search history.

(56) References Cited

U.S. PATENT DOCUMENTS 6,173,899 B1 * 1/2001 Rozin .................. G06K 7/0008
235/492
2010/0062709 A1 * 3/2010 Kato .................... H04B 13/005
343/788
(Continued)

FOREIGN PATENT DOCUMENTS

CN 102882286 A 1/2013
CN 104578222 A 4/2015
(Continued)

OTHER PUBLICATIONS

Zhang et al., "An LC Compensated Electric Field Repeater for Long
Distance Capacitive Power Transfer," 2016 IEEE Energy Conver-
sion Congress and Exposition (ECCE), Total 5 pages, Institute of
Electrical and Electronics Engineers, New York, New York (Sep.
2016).

*Primary Examiner* — Julian D Huffman
*Assistant Examiner* — Sadia Kousar
(74) *Attorney, Agent, or Firm* — Leydig, Voit & Mayer,
Ltd.

(57) ABSTRACT

A wireless charging system that pertains to the field of
wireless charging technologies is provided. The system
includes: a transmit apparatus and a receive apparatus where
the transmit apparatus includes an inverter circuit and two
transmit electrodes, an input terminal of the inverter circuit
is connected to a direct-current power supply, and two
output terminals of the inverter circuit are connected to the
two transmit electrodes respectively and where the receive
apparatus includes two receive electrodes and a rectifier
circuit, two input terminals of the rectifier circuit are con-
nected to the two receive electrodes respectively, and an
output terminal of the rectifier circuit is connected to a load.

20 Claims, 28 Drawing Sheets

(51) Int. Cl.
   *H02J 7/70*      (2026.01)
   *H02J 50/00*      (2016.01)

(56)                References Cited

U.S. PATENT DOCUMENTS

| | | | |
|---|---|---|---|
| 2011/0133569 | A1 | 6/2011 | Cheon et al. |
| 2016/0204659 | A1 | 7/2016 | Tamino et al. |
| 2017/0229916 | A1* | 8/2017 | Matsumoto ............. H02J 50/12 |
| 2018/0294682 | A1 | 10/2018 | Qiu et al. |

FOREIGN PATENT DOCUMENTS

| | | |
|---|---|---|
| CN | 105896694 A | 8/2016 |
| CN | 106300447 A | 1/2017 |
| CN | 107069979 A | 8/2017 |
| CN | 108278108 A | 7/2018 |
| CN | 109687605 A | 4/2019 |
| CN | 109728654 A | 5/2019 |
| CN | 109941128 A | 6/2019 |
| CN | 109980792 A | 7/2019 |
| EP | 2942878 A1 | 11/2015 |
| WO | 2014161912 A1 | 10/2014 |
| WO | 2019155439 A1 | 8/2019 |

* cited by examiner

WIRELESS CHARGING SYSTEM

CROSS-REFERENCE TO RELATED APPLICATIONS

This application is a continuation of International Application No. PCT/CN2020/096397, filed on Jun. 16, 2020, which claims priority to Chinese Patent Application No. 201910913196.6, filed on Sep. 25, 2019. The disclosures of the aforementioned applications are hereby incorporated by reference in their entireties.

TECHNICAL FIELD

This application relates to the field of wireless charging technologies, and in particular, to a wireless charging system.

BACKGROUND

Currently, charging an electronic device by using a wireless charging technology becomes increasingly popular. A device that implements the wireless charging technology is referred to as a wireless charger. The wireless charger may include two transmit plates, and the electronic device may include two receive plates. After the two transmit plates are placed directly opposite to the two receive plates, the two transmit plates and the two receive plates can implement electric field coupling.

When the wireless charger is used to charge the electronic device, the two transmit plates in the wireless charger generate an electric field, and the two receive plates in the electronic device generate an alternating current under the action of the electric field, thereby implementing charging of the electronic device. However, in this case, the two transmit plates need to be placed directly opposite to the two receive plates, and the two transmit plates need to be very close to the two receive plates to implement charging. Consequently, application of the wireless charging technology is greatly limited.

SUMMARY

This application provides a wireless charging system, to improve flexibility of wireless charging. The technical solutions are as follows:

According to one aspect, a wireless charging system is provided, where the system includes: a transmit apparatus and a receive apparatus.

The transmit apparatus includes an inverter circuit and two transmit electrodes, an input terminal of the inverter circuit is connected to a direct-current power supply, and two output terminals of the inverter circuit are connected to the two transmit electrodes respectively; the receive apparatus includes two receive electrodes and a rectifier circuit, two input terminals of the rectifier circuit are connected to the two receive electrodes respectively, and an output terminal of the rectifier circuit is connected to a load; and one transmit electrode of the two transmit electrodes is coupled to one receive electrode of the two receive electrodes through a first transmission medium, where electric conductivity of the first transmission medium is greater than electric conductivity of air.

The inverter circuit converts, into an alternating current, a direct current input by the direct-current power supply and then outputs the alternating current to the two transmit electrodes, so that the two transmit electrodes generate an electric field. The two receive electrodes generate an alternating current under the action of the electric field and transmit the generated alternating current to the rectifier circuit; and the rectifier circuit converts the input alternating current into a direct current and outputs the direct current to the load, so as to supply power to the load.

It should be noted that the first transmission medium may be metal or a non-metallic dielectric serving as a power transmission medium. For example, the first transmission medium may be metal such as iron, aluminum, copper, an alloy material, a metal pipe, a metal housing of a device, a metal structure of a building, or a ground grid, or may be a non-metallic dielectric such as a human body, an animal, soil, earth, or seawater provided that electric conductivity of the metal or the non-metallic dielectric is greater than the electric conductivity of the air.

It should be noted that transmission power between the transmit apparatus and the receive apparatus is directly proportional to an operating frequency of a system, equivalent coupling capacitance between the transmit electrode and the receive electrode, output voltage of the transmit apparatus, and input voltage of the receive apparatus, and therefore increasing the equivalent coupling capacitance between the transmit electrode and the receive electrode can effectively increase the transmission power between the transmit apparatus and the receive apparatus, so as to implement wireless charging over a relatively long distance. In this embodiment of this application, the one transmit electrode of the two transmit electrodes can be coupled to the one receive electrode of the two receive electrodes through the first transmission medium. Because the electric conductivity of the first transmission medium is greater than the electric conductivity of the air, that is, the first transmission medium has higher electric conductivity, the equivalent coupling capacitance between the transmit electrode and the receive electrode can be increased, thereby effectively increasing a wireless charging transmission distance and improving flexibility of wireless charging.

The other transmit electrode of the two transmit electrodes is coupled to the other receive electrode of the two receive electrodes through the air; or the other transmit electrode of the two transmit electrodes is coupled to the other receive electrode of the two receive electrodes through a second transmission medium, where electric conductivity of the second transmission medium is greater than the electric conductivity of the air.

It should be noted that, the second transmission medium may be metal or a non-metallic dielectric serving as a power transmission medium. For example, the second transmission medium may be metal such as iron, aluminum, copper, an alloy material, a metal pipe, a metal housing of a device, a metal structure of a building, or a ground grid, or may be a non-metallic dielectric such as a human body, an animal, soil, earth, or seawater provided that electric conductivity of the metal or the non-metallic dielectric is greater than the electric conductivity of the air.

It should be noted that transmission power between the transmit apparatus and the receive apparatus is directly proportional to an operating frequency of a system, equivalent coupling capacitance between the transmit electrode and the receive electrode, output voltage of the transmit apparatus, and input voltage of the receive apparatus, and therefore increasing the equivalent coupling capacitance between the transmit electrode and the receive electrode can effectively increase the transmission power between the transmit apparatus and the receive apparatus, so as to implement wireless charging over a relatively long distance. In this way, when the one transmit electrode of the two transmit electrodes is coupled to the one receive electrode of the two receive electrodes through the first transmission medium, and the other transmit electrode of the two transmit electrodes is coupled to the other receive electrode of the two receive electrodes through the second transmission medium, because both the electric conductivity of the first transmission medium and the electric conductivity of the second transmission medium are greater than the electric conductivity of the air, that is, both the first transmission medium and the second transmission medium have higher electric conductivity, the equivalent coupling capacitance between the two transmit electrodes and the two receive electrodes can be significantly increased, thereby effectively increasing a wireless charging transmission distance and improving flexibility of wireless charging.

Further, the transmit apparatus further includes a first compensation circuit, and the first compensation circuit is connected between the inverter circuit and the two transmit electrodes. The receive apparatus further includes a second compensation circuit, and the second compensation circuit is connected between the two receive electrodes and the rectifier circuit.

In this embodiment of this application, the first compensation circuit is configured to compensate for capacitive reactance between the transmit apparatus and the receive apparatus. The second compensation circuit is configured to compensate for capacitive reactance between the receive apparatus and the transmit apparatus. The first compensation circuit can reduce a reactive power loss in the transmit apparatus, and the second compensation circuit can reduce a reactive power loss in the receive apparatus, thereby improving power transmission efficiency.

Further, the first compensation circuit is further configured to increase voltage of an alternating current output by the inverter circuit. The second compensation circuit is further configured to decrease voltage of an alternating current generated in the two receive electrodes.

It should be noted that transmission power between the transmit apparatus and the receive apparatus is directly proportional to an operating frequency of a system, equivalent coupling capacitance between the transmit electrode and the receive electrode, output voltage of the transmit apparatus, and input voltage of the receive apparatus, and therefore increasing the output voltage of the transmit apparatus and the input voltage of the receive apparatus can effectively increase the transmission power between the transmit apparatus and the receive apparatus, so as to implement wireless charging over a relatively long distance. In this embodiment of this application, the first compensation circuit can increase the voltage of the alternating current output by the inverter circuit; and in this way, a relatively strong electric field can be formed around the two transmit electrodes, thereby effectively increasing a wireless charging transmission distance and improving flexibility of wireless charging.

Optionally, the one transmit electrode comes into contact with the first transmission medium, or a distance between the one transmit electrode and the first transmission medium is greater than 0 and less than a first distance. The one receive electrode comes into contact with the first transmission medium, or a distance between the one receive electrode and the first transmission medium is greater than 0 and less than a second distance.

Optionally, the one transmit electrode is at least a portion of a metal structural part of a wireless charging transmit device in which the transmit apparatus is located, or the one transmit electrode is located on an inner side of a housing of the wireless charging transmit device. The one receive electrode is at least a portion of a metal structural part of a wireless charging receive device in which the receive apparatus is located, or the one receive electrode is located on an inner side of a housing of the wireless charging receive device.

According to one aspect, a wireless charging system is provided, where the system includes: a transmit apparatus and a receive apparatus.

The transmit apparatus includes an inverter circuit and one transmit electrode, an input terminal of the inverter circuit is connected to a direct-current power supply, one output terminal of the inverter circuit is connected to the transmit electrode, and the other output terminal of the inverter circuit is connected to an output terminal of the transmit apparatus. The receive apparatus includes one receive electrode and a rectifier circuit, one input terminal of the rectifier circuit is connected to the receive electrode, the other input terminal of the rectifier circuit is connected to an input terminal of the receive apparatus, and an output terminal of the rectifier circuit is connected to a load. The transmit electrode is coupled to the receive electrode through a power transmission medium, where electric conductivity of the power transmission medium is greater than electric conductivity of air.

The inverter circuit converts, into an alternating current, a direct current input by the direct-current power supply and then outputs the alternating current through the two output terminals of the inverter circuit, so that the transmit electrode and the output terminal of the transmit apparatus generate an electric field. The receive electrode and the input terminal of the receive apparatus generate an alternating current under the action of the electric field and transmit the generated alternating current to the rectifier circuit; and the rectifier circuit converts the input alternating current into a direct current and outputs the direct current to the load, so as to supply power to the load.

It should be noted that the power transmission medium may be metal or a non-metallic dielectric. For example, the power transmission medium may be metal such as iron, aluminum, copper, an alloy material, a metal pipe, a metal housing of a device, a metal structure of a building, or a ground grid, or may be a non-metallic dielectric such as a human body, an animal, soil, earth, or seawater provided that electric conductivity of the metal or the non-metallic dielectric is greater than the electric conductivity of the air.

It should be noted that transmission power between the transmit apparatus and the receive apparatus is directly proportional to an operating frequency of a system, equivalent coupling capacitance between the transmit electrode and the receive electrode, output voltage of the transmit apparatus, and input voltage of the receive apparatus, and therefore increasing the equivalent coupling capacitance between the transmit electrode and the receive electrode can effectively increase the transmission power between the transmit apparatus and the receive apparatus, so as to implement wireless charging over a relatively long distance. In this embodiment of this application, the transmit electrode can be coupled to the receive electrode through the power transmission medium. Because the electric conductivity of the power transmission medium is greater than the electric conductivity of the air, that is, the power transmission medium has higher electric conductivity, the equivalent coupling capacitance between the transmit electrode and the receive electrode can be increased, thereby effectively increasing a wireless charging transmission distance and improving flexibility of wireless charging.

In addition, in this embodiment of this application, the transmit apparatus needs to include only one transmit electrode, and the receive apparatus needs to include only one receive electrode, to implement wireless charging for the receive apparatus by the transmit apparatus, thereby effectively reducing costs, volumes, and weight of the transmit apparatus and the receive apparatus and further improving flexibility of wireless charging.

Further, the transmit apparatus further includes a first compensation circuit, and the first compensation circuit is connected between the inverter circuit and the transmit electrode, and is connected between the invert circuit and the output terminal of the transmit apparatus. The receive apparatus further includes a second compensation circuit, and the second compensation circuit is connected between the receive electrode and the rectifier circuit, and is connected between the input terminal of the receive apparatus and the rectifier circuit.

In this embodiment of this application, the first compensation circuit is configured to compensate for capacitive reactance between the transmit apparatus and the receive apparatus. The second compensation circuit is configured to compensate for capacitive reactance between the receive apparatus and the transmit apparatus. The first compensation circuit can reduce a reactive power loss in the transmit apparatus, and the second compensation circuit can reduce a reactive power loss in the receive apparatus, thereby improving power transmission efficiency.

Further, the first compensation circuit is further configured to increase voltage of an alternating current output by the inverter circuit. The second compensation circuit is further configured to decrease voltage of an alternating current generated in the receive electrode and the input terminal of the receive apparatus.

It should be noted that transmission power between the transmit apparatus and the receive apparatus is directly proportional to an operating frequency of a system, equivalent coupling capacitance between the transmit electrode and the receive electrode, output voltage of the transmit apparatus, and input voltage of the receive apparatus, and therefore increasing the output voltage of the transmit apparatus and the input voltage of the receive apparatus can effectively increase the transmission power between the transmit apparatus and the receive apparatus, so as to implement wireless charging over a relatively long distance. In this embodiment of this application, the first compensation circuit can increase the voltage of the alternating current output by the inverter circuit; and in this way, a relatively strong electric field can be formed around the transmit electrode and the output terminal of the transmit apparatus, thereby effectively increasing a wireless charging transmission distance and improving flexibility of wireless charging.

Optionally, the transmit electrode comes into contact with the power transmission medium, or a distance between the transmit electrode and the power transmission medium is greater than 0 and less than a first distance. The receive electrode comes into contact with the power transmission medium, or a distance between the receive electrode and the power transmission medium is greater than 0 and less than a second distance.

Optionally, the transmit electrode is at least a portion of a metal structural part of a wireless charging transmit device in which the transmit apparatus is located, or the transmit electrode is located on an inner side of a housing of the wireless charging transmit device. The receive electrode is at least a portion of a metal structural part of a wireless charging receive device in which the receive apparatus is located, or the receive electrode is located on an inner side of a housing of the wireless charging receive device.

According to one aspect, a wireless charging system is provided, where the system includes: a transmit apparatus and a receive apparatus.

The transmit apparatus includes an inverter circuit and two transmit electrodes, an input terminal of the inverter circuit is connected to a direct-current power supply, and two output terminals of the inverter circuit are connected to the two transmit electrodes respectively; and the two transmit electrodes are coupled through a power transmission medium, where electric conductivity of the power transmission medium is greater than electric conductivity of air. The receive apparatus includes a receive coil and a rectifier circuit, an input terminal of the rectifier circuit is connected to the receive coil, and an output terminal of the rectifier circuit is connected to a load.

The inverter circuit converts, into an alternating current, a direct current input by the direct-current power supply and then outputs the alternating current to the two transmit electrodes, so that an alternating current is generated in the power transmission medium between the two transmit electrodes. The alternating current in the power transmission medium excites a magnetic field. The receive coil generates an alternating current under the action of the magnetic field and transmits the generated alternating current to the rectifier circuit; and the rectifier circuit converts the input alternating current into a direct current and outputs the direct current to the load, so as to supply power to the load.

It should be noted that the power transmission medium may be metal or a non-metallic dielectric. For example, the power transmission medium may be metal such as iron, aluminum, copper, an alloy material, a metal pipe, a metal housing of a device, a metal structure of a building, or a ground grid, or may be a non-metallic dielectric such as a human body, an animal, soil, earth, or seawater provided that electric conductivity of the metal or the non-metallic dielectric is greater than the electric conductivity of the air.

In this embodiment of this application, the two transmit electrodes in the transmit apparatus may be coupled through the power transmission medium whose electric conductivity is greater than the electric conductivity of the air; and in this way, an alternating current may be generated in the power transmission medium, and the alternating current can excite the magnetic field. The alternating current is generated in the receive coil of the receive apparatus through electromagnetic induction, to implement wireless charging, thereby improving flexibility of wireless charging.

Further, the transmit apparatus further includes a first compensation circuit, and the first compensation circuit is connected between the inverter circuit and the two transmit electrodes. The receive apparatus further includes a second compensation circuit, and the second compensation circuit is connected between the receive coil and the rectifier circuit.

In this embodiment of this application, the first compensation circuit is configured to compensate for capacitive reactance between the two transmit electrodes. The second compensation circuit is configured to compensate for inductive reactance of the receive coil. The first compensation circuit can reduce a reactive power loss in the transmit apparatus, and the second compensation circuit can reduce a reactive power loss in the receive apparatus, thereby improving power transmission efficiency.

Optionally, at least one transmit electrode of the two transmit electrodes comes into contact with the power transmission medium; or a distance between at least one transmit electrode of the two transmit electrodes and the power transmission medium is greater than 0 and less than a reference distance; or one transmit electrode of the two transmit electrodes comes into contact with the power transmission medium, and a distance between the other transmit electrode and the power transmission medium is greater than 0 and less than a reference distance.

Optionally, at least one transmit electrode of the two transmit electrodes is at least a portion of a metal structural part of a wireless charging transmit device in which the transmit apparatus is located; or at least one transmit electrode of the two transmit electrodes is located on an inner side of a housing of the wireless charging transmit device; or one transmit electrode of the two transmit electrodes is at least a portion of a metal structural part of the wireless charging transmit device, and the other transmit electrode is located on an inner side of a housing of the wireless charging transmit device.

The technical solutions provided in this application can bring at least the following beneficial effects:

The wireless charging system includes the transmit apparatus and the receive apparatus. The transmit apparatus includes the inverter circuit and the two transmit electrodes. The receive apparatus includes the two receive electrodes and the rectifier circuit. The inverter circuit converts, into the alternating current, the direct current input by the direct-current power supply and then outputs the alternating current to the two transmit electrodes, so that the two transmit electrodes generate the electric field. The two receive electrodes generate the alternating current under the action of the electric field and transmit the generated alternating current to the rectifier circuit; and the rectifier circuit converts the input alternating current into the direct current and outputs the direct current to the load, so as to supply power to the load. Because the one transmit electrode of the two transmit electrodes is coupled to the one receive electrode of the two receive electrodes through the first transmission medium whose electric conductivity is greater than the electric conductivity of the air, the equivalent coupling capacitance between the transmit electrode and the receive electrode can be increased, thereby effectively increasing the wireless charging transmission distance and improving flexibility of wireless charging.

REFERENCE NUMERALS IN THE DRAWINGS

10: transmit apparatus, 101: direct-current power supply, 102: inverter circuit, 103: transmit electrode, 104:

transmit electrode, 105: first compensation circuit, 20: receive apparatus, 201: rectifier circuit, 202: load, 203: receive electrode, 204: receive electrode, 205: second compensation circuit, 206: receive coil, 30: first transmission medium, 40: second transmission medium, 50: power transmission medium, P1: output terminal of a transmit apparatus, and P2: input terminal of a receive apparatus; and 60: mobile phone, 601: internal circuit of a transmit apparatus, 61: smart watch, 611: internal circuit of a receive apparatus, 62: user, 63: smart ring, 631: internal circuit of a receive apparatus, 64: electronic device, 641: internal circuit of a receive apparatus, 65: ground, 70: power transmit apparatus, 701: internal circuit of a transmit apparatus, 71: smoke sensor, 711: internal circuit of a receive apparatus, 72: roof, 73: monitor, 731: internal circuit of a receive apparatus, 74: electronic device, 741: internal circuit of a receive apparatus, and 75: metal layer.

DESCRIPTION OF EMBODIMENTS

To make the objectives, technical solutions, and advantages of this application clearer, the following further describes the implementations of this application in detail with reference to the accompanying drawings.

Before detailed illustration of the embodiments of this application, application scenarios of the embodiments of this application are first described.

In a wireless charging scenario, a transmission distance is a key parameter that affects user experience. Currently, an electronic device needs to be directly opposite to and keep very close to a wireless charging pad before getting charged, which significantly limits application of a wireless charging technology. Therefore, the embodiments of this application provide a wireless charging system that is applicable to a wireless charging scenario with a power transmission medium (such as metal or a non-metallic dielectric) whose electric conductivity is greater than electric conductivity of air. For example, the wireless charging system is applicable to scenarios such as wireless charging for a wearable device, wireless charging for a monitoring device and a sensor in a building, and wireless charging for a desktop electronic device. The wireless charging system provided in the embodiments of this application can freely and flexibly implement wireless charging in a relatively large space, thereby broadening the application of the wireless charging technology.

Figure 1:
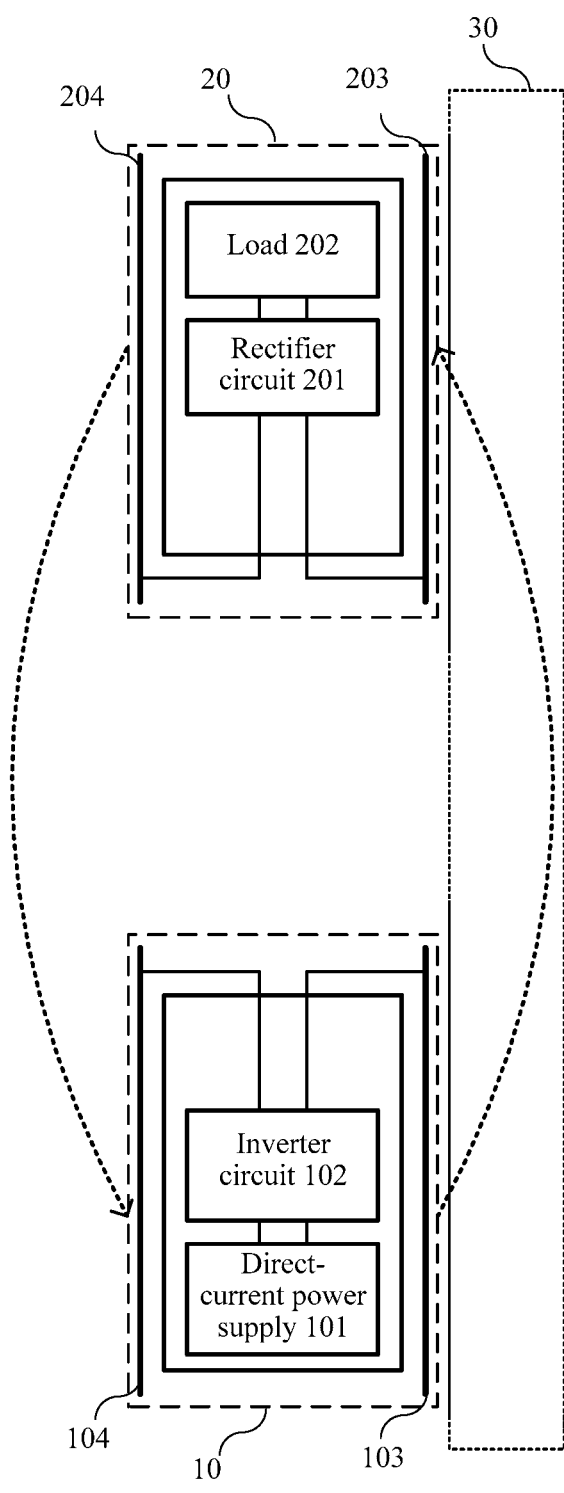
FIG. 1 is a schematic structural diagram of a first wireless charging system according to an embodiment of this application.

FIG. 1 is a schematic structural diagram of a wireless charging system according to an embodiment of this application. Referring to FIG. 1, the system includes a transmit apparatus 10 and a receive apparatus 20.

The transmit apparatus 10 includes an inverter circuit 102 and two transmit electrodes (103 and 104 shown in the figure), an input terminal of the inverter circuit 102 is connected to a direct-current power supply 101, and two output terminals of the inverter circuit 102 are connected to the two transmit electrodes respectively. The receive apparatus 20 includes two receive electrodes (203 and 204 shown in the figure) and a rectifier circuit 201, two input terminals of the rectifier circuit 201 are connected to the two receive electrodes respectively, and an output terminal of the rectifier circuit 201 is connected to a load 202. One transmit electrode 103 in the two transmit electrodes is coupled to one receive electrode 203 of the two receive electrodes through a first transmission medium 30, where electric conductivity of the first transmission medium 30 is greater than electric conductivity of air.

The inverter circuit 102 converts, into an alternating current, a direct current input by the direct-current power supply 101 and then outputs the alternating current to the two transmit electrodes, so that the two transmit electrodes generate an electric field. The two receive electrodes generate an alternating current under the action of the electric field and transmit the generated alternating current to the rectifier circuit 201; and the rectifier circuit 201 converts the input alternating current into a direct current and outputs the direct current to the load 202, so as to supply power to the load 202.

It should be noted that the transmit apparatus 10 belongs to a wireless charging transmit device, and the receive apparatus 20 belongs to a wireless charging receive device. The wireless charging transmit device is configured to charge the wireless charging receive device. The wireless charging transmit device and the wireless charging receive device may be various types of electronic devices. That is, the transmit apparatus 10 and the receive apparatus 20 may be disposed in various types of electronic devices. For example, the transmit apparatus 10 and the receive apparatus 20 may be disposed in electronic devices such as a handheld electronic device, a wearable electronic device, a desktop electronic device, or a wall-mounted electronic device. These electronic devices may include a mobile phone, a smart watch, a smart ring, a mobile power pack, a computer, a monitoring device, a sensor, and the like.

In addition, the direct-current power supply 101 may provide power. For example, the direct-current power supply 101 may be an independently disposed power module, or may be a battery of the wireless charging transmit device, or the like. This is not limited in this embodiment of this application. The load 202 may receive the power. For example, the load 202 may be a light emitting diode (LED) lamp, a chip, a battery of the wireless charging receive device, or the like. This is not limited in this embodiment of this application.

In addition, the first transmission medium 30 may be metal or a non-metallic dielectric serving as a power transmission medium. For example, the first transmission medium 30 may be metal such as iron, aluminum, copper, an alloy material, a metal pipe, a metal housing of a device, a metal structure of a building, or a ground grid, or may be a non-metallic dielectric such as a human body, an animal, soil, earth, or seawater provided that electric conductivity of the metal or the non-metallic dielectric is greater than the electric conductivity of the air.

It should be noted that the inverter circuit 102 is configured to convert a direct current into an alternating current, and may also be referred to as a direct current-alternating current conversion circuit. The rectifier circuit 201 is configured to convert an alternating current into a direct current, and may also be referred to as an alternating current-direct current conversion circuit. The inverter circuit 102 converts, into the alternating current, the direct current input by the direct-current power supply 101 and then outputs the alternating current to the two transmit electrodes. In this case, voltage is generated between the two transmit electrodes, to form an electric field around the two transmit electrodes. Inducting voltage is generated between the two receive electrodes under the action of the electric field; and in this way, the alternating current is generated between the two receive electrodes. The rectifier circuit 201 converts the alternating current in the two receive electrodes into a direct current and then outputs the direct current to the load 202, so as to supply power to the load 202, thereby implementing wireless charging for the receive apparatus 20 by the transmit apparatus 10.

It should be noted that, in a possible implementation, the inverter circuit 102 may convert, into a high-frequency alternating current, the direct current input by the direct-current power supply 101 and then output the high-frequency alternating current to the two transmit electrodes. In this way, the two transmit electrodes generate a high-frequency electric field. The two receive electrodes generate a high-frequency alternating current under the action of the high-frequency electric field; and the rectifier circuit 201 may convert the high-frequency alternating current into a direct current applicable to the load 202 and outputs the direct current to the load 202, so as to supply power to the load 202.

In addition, locations of the two transmit electrodes may be set based on use requirements. To improve power transmission efficiency, a coupling degree between the two transmit electrodes should be minimized, so as to minimize a directly-opposite area of the two transmit electrodes. For example, the two transmit electrodes may be respectively disposed at a rear housing and a frame of the wireless charging transmit device. Similarly, locations of the two receive electrodes may be set based on use requirements. To improve power transmission efficiency, a coupling degree between the two receive electrodes should be minimized, so as to minimize a directly-opposite area of the two receive electrodes. For example, the two receive electrodes may be respectively disposed at a rear housing and a frame of the wireless charging receive device.

In addition, when the wireless charging system in this embodiment of this application is actually used, a ground point may not be disposed. That is, the wireless charging system may be an integral suspended structure. In addition, to implement charging, the two transmit electrodes in the transmit apparatus 10 do not need to be placed directly opposite to the two receive electrodes in the receive apparatus 20, thereby improving flexibility of wireless charging.

It should be noted that transmission power between the transmit apparatus 10 and the receive apparatus 20 is directly proportional to an operating frequency of a system, equivalent coupling capacitance between the transmit electrode and the receive electrode, output voltage of the transmit apparatus 10, and input voltage of the receive apparatus 20, and therefore increasing the equivalent coupling capacitance between the transmit electrode and the receive electrode can effectively increase the transmission power between the transmit apparatus 10 and the receive apparatus 20, so as to implement wireless charging over a relatively long distance. In this embodiment of this application, the one transmit electrode 103 of the two transmit electrodes can be coupled to the one receive electrode 203 of the two receive electrodes through the first transmission medium 30. Because the electric conductivity of the first transmission medium 30 is greater than the electric conductivity of the air, that is, the first transmission medium 30 has higher electric conductivity, the equivalent coupling capacitance between the transmit electrode 103 and the receive electrode 203 can be increased, thereby effectively increasing a wireless charging transmission distance and improving flexibility of wireless charging.

Figure 2:
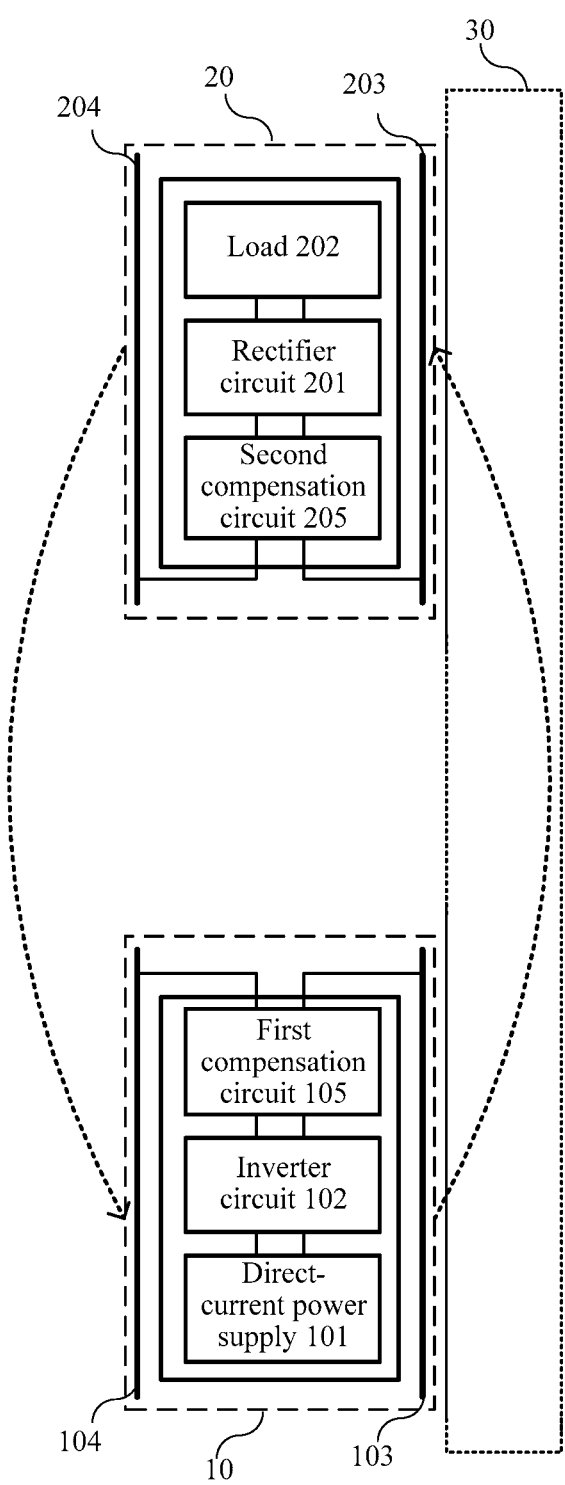
FIG. 2 is a schematic structural diagram of a second wireless charging system according to an embodiment of this application.

Further, referring to FIG. 2, the transmit apparatus 10 may further include a first compensation circuit 105, the first compensation circuit 105 is connected between the inverter circuit 102 and the two transmit electrodes, and the first compensation circuit 105 and a second compensation circuit 205 are configured to compensate for capacitive reactance between the transmit apparatus 10 and the receive apparatus 20. Further, referring to FIG. 2, the receive apparatus 20 may further include the second compensation circuit 205, the second compensation circuit 205 is connected between the two receive electrodes and the rectifier circuit 201, and the second compensation circuit 205 is configured to compensate for capacitive reactance between the receive apparatus 20 and the transmit apparatus 10.

It should be noted that two input terminals of the first compensation circuit 105 are connected to two output terminals of the inverter circuit 102 respectively, and the two output terminals of the first compensation circuit 105 are connected to the two transmit electrodes respectively. Two input terminals of the second compensation circuit 205 are connected to two receive electrodes respectively, and the two output terminals of the second compensation circuit 205 are connected to the two input terminals of the rectifier circuit 201 respectively. The first compensation circuit 105 can reduce a reactive power loss in the transmit apparatus 10, and the second compensation circuit 205 can reduce a reactive power loss in the receive apparatus 20, thereby improving power transmission efficiency.

Further, the first compensation circuit 105 can also increase voltage of an alternating current output by the inverter circuit 102 to increase output voltage of the transmit apparatus 10, thereby further increasing input voltage of the receive apparatus 20. In this case, voltage of an alternating current generated in the two receive electrodes is relatively high, and therefore the second compensation circuit 205 may further decrease the voltage of the alternating current generated in the two receive electrodes.

For example, after the inverter circuit 102 converts, into a high-frequency low-voltage alternating current, the direct current input by the direct-current power supply 101, the first compensation circuit 105 can convert the high-frequency low-voltage alternating current into a high-frequency high-voltage alternating current and then apply the high-frequency high-voltage alternating current to the two transmit electrodes to generate a high-frequency electric field. In this case, the two receive electrodes generate a high-frequency high-voltage alternating current under the action of the high-frequency electric field, the second compensation circuit 205 converts the high-frequency high-voltage alternating current into a high-frequency low-voltage alternating current, and the rectifier circuit 201 converts the high-frequency low-voltage alternating current into a direct current applicable to the load 202 and outputs the direct current to the load 202, so as to supply power to the load 202.

It should be noted that the first compensation circuit 105 may be a boost circuit or a boost apparatus when the first compensation circuit 105 can also increase the voltage of the alternating current output by the inverter circuit 102. For example, the first compensation circuit 105 may be an LC (inductor-capacitor) resonance boost circuit, a planar spiral boost coil, a transformer, or the like. This is not limited in this embodiment of this application. The second compensation circuit 205 may be a buck circuit or a buck apparatus when the second compensation circuit 205 can also decrease the voltage of the alternating current generated in the two receive electrodes. For example, the second compensation circuit 205 may be an LC resonance buck circuit, a planar spiral buck coil, a transformer, or the like. This is not limited in this embodiment of this application.

Figure 3:
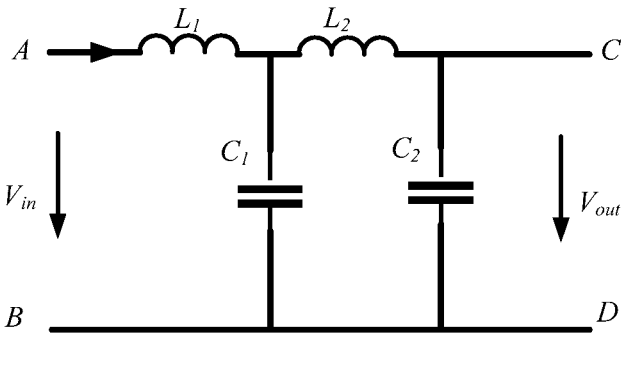
FIG. 3 is a schematic structural diagram of an LC resonance boost circuit according to an embodiment of this application.
Figure 4:
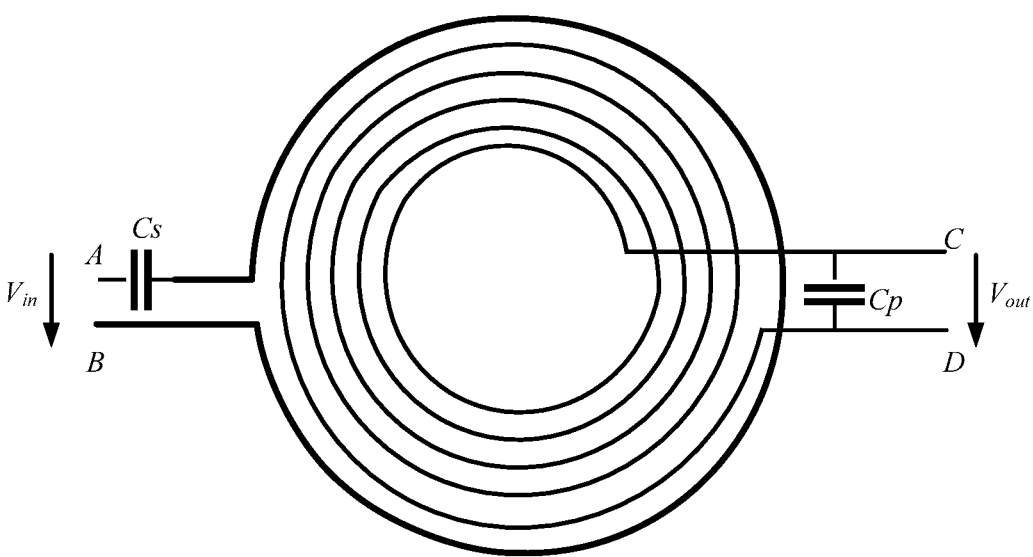
FIG. 4 is a schematic structural diagram of a planar spiral boost coil according to an embodiment of this application.

For example, the first compensation circuit 105 may be an LC resonance boost circuit shown in FIG. 3, $C_1$ and $C_2$ are compensation capacitors, $L_1$ and $L_2$ are compensation inductors, a terminal A and a terminal B are two input terminals of the first compensation circuit 105, and a terminal C and a terminal D are two output terminals of the first compensation circuit 105. Alternatively, the first compensation circuit 105 may be a planar spiral boost coil shown in FIG. 4, the terminal A and the terminal B are connected to a primary coil at an outermost turn, Cs is a series compensation capacitor of the primary coil, the terminal C and the terminal D are connected to a multi-turn secondary coil, Cp is a parallel compensation capacitor of the secondary coil, the terminal A and the terminal B are the two input terminals of the first compensation circuit 105, and the terminal C and the terminal D are two output terminals of the first compensation circuit 105.

Figure 5:
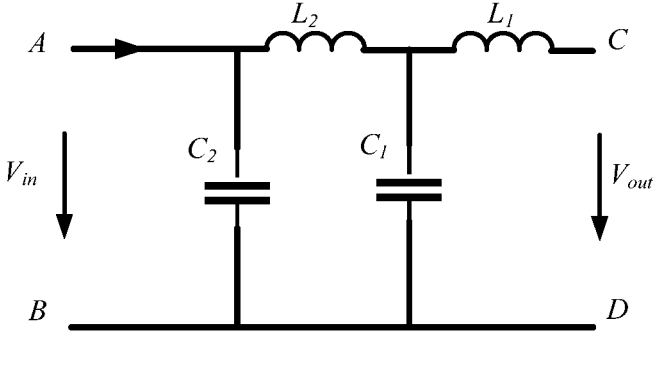
FIG. 5 is a schematic structural diagram of an LC resonance buck circuit according to an embodiment of this application.
Figure 6:
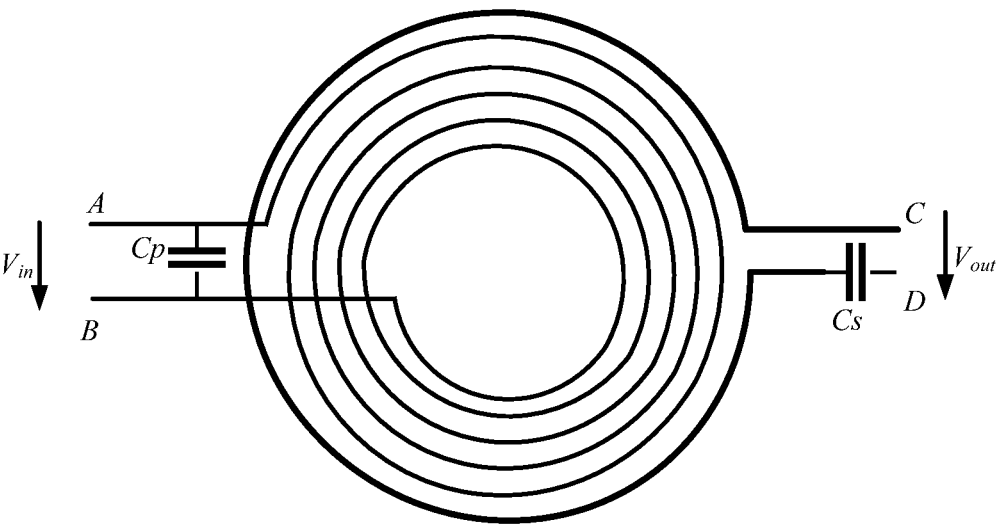
FIG. 6 is a schematic structural diagram of a planar spiral buck coil according to an embodiment of this application.

For another example, the second compensation circuit 205 may be an LC resonance buck circuit shown in FIG. 5, $C_1$ and $C_2$ are compensation capacitors, $L_1$ and $L_2$ are compensation inductors, a terminal A and a terminal B are two input terminals of the second compensation circuit 205, and a terminal C and a terminal D are two output terminals of the second compensation circuit 205. Alternatively, the second compensation circuit 205 may be a planar spiral buck coil shown in FIG. 6, the terminal A and the terminal B are connected to a multi-turn secondary coil, Cp is a parallel compensation capacitor of the secondary coil, the terminal C and the terminal D are connected to a primary coil at an outermost turn, Cs is a series compensation capacitor of the primary coil, the terminal A and the terminal B are the two input terminals of the second compensation circuit 205, and the terminal C and the terminal D are two output terminals of the second compensation circuit 205.

It should be noted that transmission power between the transmit apparatus 10 and the receive apparatus 20 is directly proportional to an operating frequency of a system, equivalent coupling capacitance between the transmit electrode and the receive electrode, output voltage of the transmit apparatus 10, and input voltage of the receive apparatus 20, and therefore increasing the output voltage of the transmit apparatus 10 and the input voltage of the receive apparatus 20 can effectively increase the transmission power between the transmit apparatus 10 and the receive apparatus 20, so as to implement wireless charging over a relatively long distance. In this embodiment of this application, first compensation circuit 105 can increase the voltage of the alternating current output by the inverter circuit 102. In this way, a relatively strong electric field can be formed around the two transmit electrodes, thereby effectively increasing a wireless charging transmission distance and improving flexibility of wireless charging.

Figure 7:
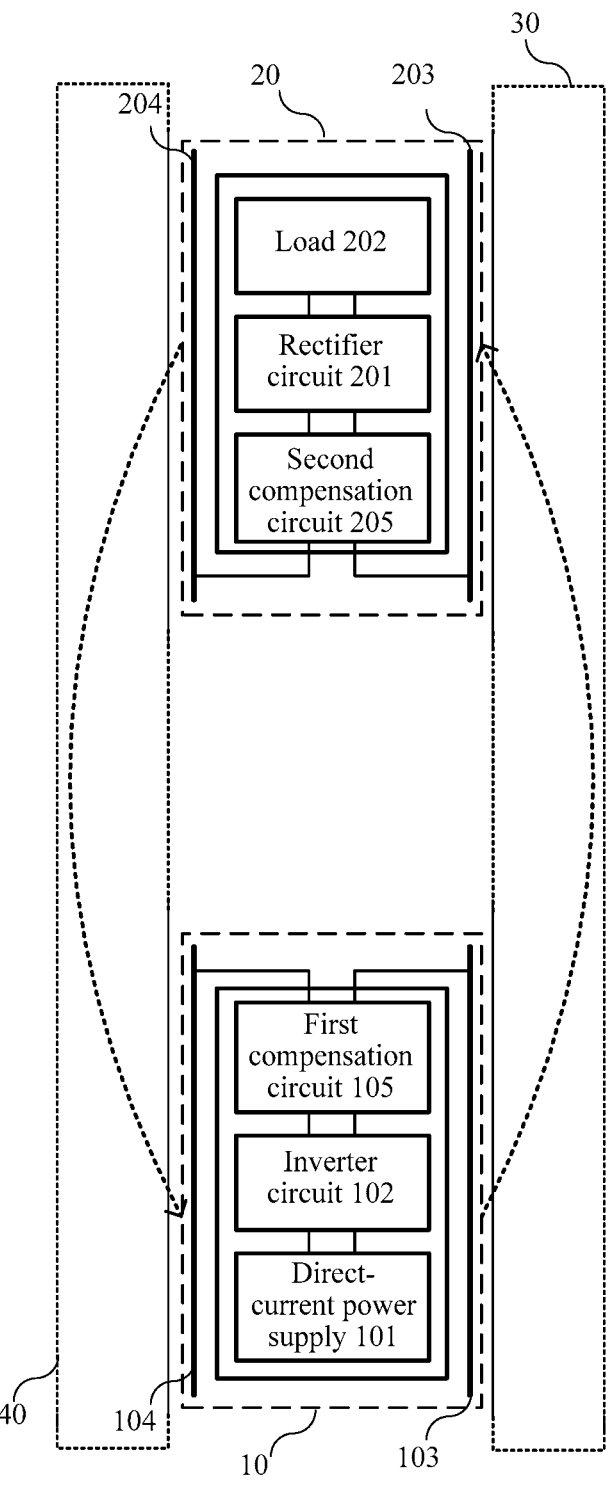
FIG. 7 is a schematic structural diagram of a third wireless charging system according to an embodiment of this application.

Referring to FIG. 1, the other transmit electrode 104 of the two transmit electrodes is coupled to the other receive electrode 204 in the two receive electrodes through the air; or referring to FIG. 7, the other transmit electrode 104 of the two transmit electrodes is coupled to the other receive electrode 204 in the two receive electrodes through a second transmission medium 40, where electric conductivity of the second transmission medium 40 is greater than the electric conductivity of the air.

It should be noted that, the second transmission medium 40 may be metal or a non-metallic dielectric serving as a power transmission medium. For example, the second transmission medium 40 may be metal such as iron, aluminum, copper, an alloy material, a metal pipe, a metal housing of a device, a metal structure of a building, or a ground grid, or may be a non-metallic dielectric such as a human body, an animal, soil, earth, or seawater provided that electric conductivity of the metal or the non-metallic dielectric is greater than the electric conductivity of the air. The second transmission medium 40 may be the same as or different from the first transmission medium 30.

In addition, both the one transmit electrode 103 of the two transmit electrodes and the one receive electrode 203 of the two receive electrodes are coupled to the first transmission medium 30, to form a power transmission path. Both the other transmit electrode 104 of the two transmit electrodes and the other receive electrode 204 in the two receive electrodes are coupled to the air or the second transmission medium 40, to form another power transmission path. The two power transmission paths form a power loop. In this case, after the two transmit electrodes generate the electric field, inducting voltage is generated between the two receive electrodes due to the electric field, so as to generate the alternating current between the two receive electrodes.

It should be noted that transmission power between the transmit apparatus 10 and the receive apparatus 20 is directly proportional to an operating frequency of a system, equivalent coupling capacitance between the transmit electrode and the receive electrode, output voltage of the transmit apparatus 10, and input voltage of the receive apparatus 20, and therefore increasing the equivalent coupling capacitance between the transmit electrode and the receive electrode can effectively increase the transmission power between the transmit apparatus 10 and the receive apparatus 20, so as to implement wireless charging over a relatively long distance. In this way, when the one transmit electrode 103 of the two transmit electrodes is coupled to the one receive electrode 203 of the two receive electrodes through the first transmission medium 30, and the other transmit electrode 104 of the two transmit electrodes is coupled to the other receive electrode 204 in the two receive electrodes through the second transmission medium 40, because both the electric conductivity of the first transmission medium 30 and the electric conductivity of the second transmission medium 40 are greater than the electric conductivity of the air, that is, both the first transmission medium 30 and the second transmission medium 40 have higher electric conductivity, the equivalent coupling capacitance between the two transmit electrodes and the two receive electrodes can be significantly increased, thereby effectively increasing a wireless charging transmission distance and improving flexibility of wireless charging.

It should be noted that the one transmit electrode 103 of the two transmit electrodes may come into direct contact with the first transmission medium 30. Alternatively, the transmit electrode 103 may not come into contact with the first transmission medium 30. That is, there may be some distance between the transmit electrode 103 and the first transmission medium 30. Specifically, the distance between the transmit electrode 103 and the first transmission medium 30 may be greater than 0 and less than a first distance, and the first distance may be preset. When the transmit electrode 103 does not come into contact with the first transmission medium 30, there may be another object between the transmit electrode 103 and the first transmission medium 30. For example, there may be an insulating material between the transmit electrode 103 and the first transmission medium 30. This is not limited in this embodiment of this application.

The transmit electrode 103 may be made of metal such as iron, aluminum, copper, or alloy. In actual application, the transmit electrode 103 may be an independently disposed component. Alternatively, the transmit electrode 103 may be at least a portion of a metal structural part of the wireless charging transmit device. In this case, the transmit electrode 103 may come into direct contact with the first transmission medium 30. Certainly, the transmit electrode 103 may alternatively not come into contact with the first transmission medium 30, and the metal structural part may be a metal housing, a metal frame, or the like. Alternatively, the transmit electrode 103 may be located on an inner side of a housing of the wireless charging transmit device. In this case, the housing of the wireless charging transmit device is located between the transmit electrode 103 and the first transmission medium 30. The housing may be made of an insulating material, metal, or the like.

Similarly, the one receive electrode 203 of the two receive electrodes may come into direct contact with the first transmission medium 30. Alternatively, the receive electrode 203 may not come into contact with the first transmission medium 30. That is, there may be some distance between the receive electrode 203 and the first transmission medium 30. Specifically, the distance between the receive electrode 203 and the first transmission medium 30 may be greater than 0 and less than a second distance, and the second distance may be preset. When the receive electrode 203 does not come into contact with the first transmission medium 30, there may be another object between the receive electrode 203 and the first transmission medium 30. For example, there may be an insulating material between the receive electrode 203 and the first transmission medium 30. This is not limited in this embodiment of this application.

The receive electrode 203 may be made of metal such as iron, aluminum, copper, or alloy. In actual application, the receive electrode 203 may be an independently disposed component. Alternatively, the receive electrode 203 may be at least a portion of a metal structural part of the wireless charging receive device. In this case, the receive electrode 203 may come into direct contact with the first transmission medium 30. Certainly, the receive electrode 203 may alternatively not come into contact with the first transmission medium 30, and the metal structural part may be a metal housing, a metal frame, or the like. Alternatively, the receive electrode 203 may be located on an inner side of a housing of the wireless charging receive device. In this case, the housing of the wireless charging receive device is located between the receive electrode 203 and the first transmission medium 30. The housing may be made of an insulating material, metal, or the like.

Similarly, when the other transmit electrode 104 of the two transmit electrodes is coupled to the other receive electrode 204 in the two receive electrodes through the second transmission medium 40, the other transmit electrode 104 may or may not come into contact with the second transmission medium 40, and the other receive electrode 204 may or may not come into contact with the second transmission medium 40. A structure between the other transmit electrode 104, the second transmission medium 40, and the other receive electrode 204 is similar to a structure between the one transmit electrode 103, the first transmission medium 30, and the one receive electrode 203. Details are not described again in this embodiment of this application.

In this embodiment of this application, the wireless charging system includes the transmit apparatus 10 and the receive apparatus 20. The transmit apparatus 10 includes an inverter circuit 102 and two transmit electrodes. The receive apparatus 20 includes two receive electrodes and a rectifier circuit 201. The inverter circuit 102 converts, into an alternating current, a direct current input by the direct-current power supply 101 and then outputs the alternating current to the two transmit electrodes, so that the two transmit electrodes generate an electric field. The two receive electrodes generate an alternating current under the action of the electric field and transmit the generated alternating current to the rectifier circuit 201; and the rectifier circuit 201 converts the input alternating current into a direct current and outputs the direct current to the load 202, so as to supply power to the load 202. Because the one transmit electrode 103 of the two transmit electrodes is coupled to the one receive electrode 203 of the two receive electrodes through the first transmission medium 30 whose electric conductivity is greater than the electric conductivity of the air, the equivalent coupling capacitance between the transmit electrode 103 and the receive electrode 203 can be increased, thereby effectively increasing a wireless charging transmission distance and improving flexibility of wireless charging.

Figure 8:
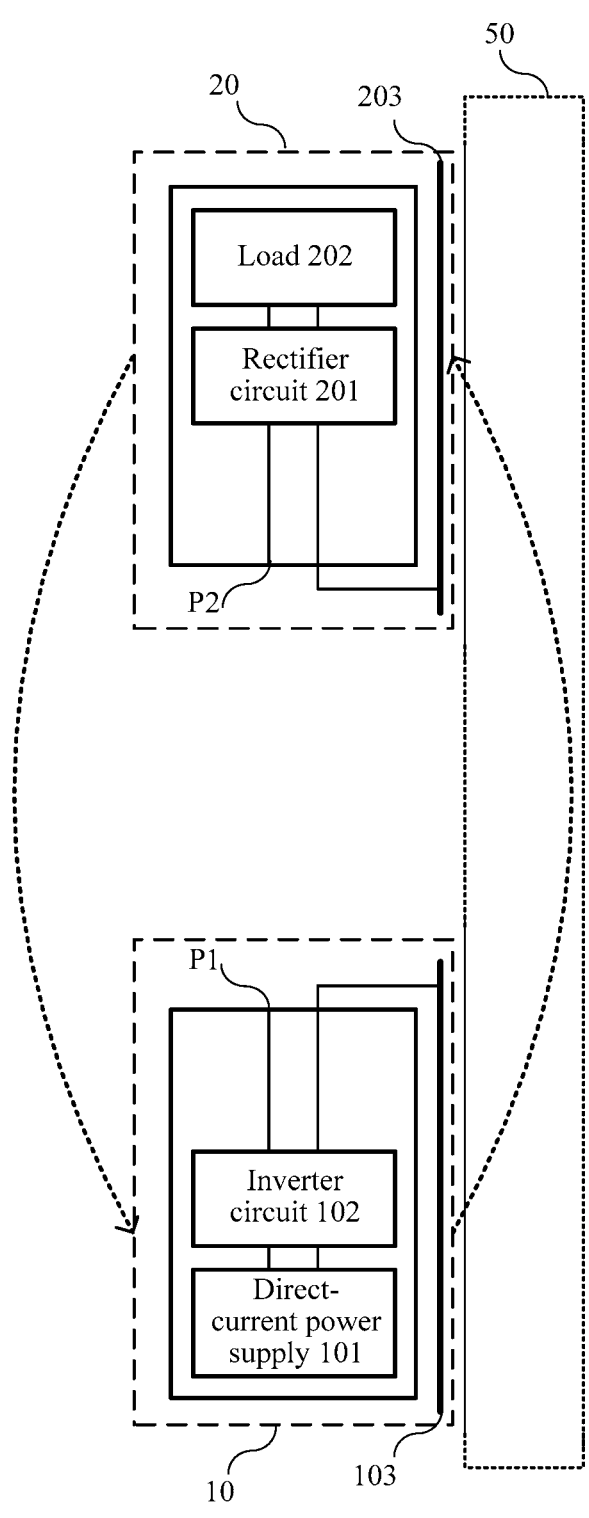
FIG. 8 is a schematic structural diagram of a fourth wireless charging system according to an embodiment of this application.

FIG. 8 is a schematic structural diagram of a wireless charging system according to an embodiment of this application. Referring to FIG. 8, the system includes a transmit apparatus 10 and a receive apparatus 20.

The transmit apparatus 10 includes an inverter circuit 102 and one transmit electrode 103, an input terminal of the inverter circuit 102 is connected to a direct-current power supply 101, one output terminal of the inverter circuit 102 is connected to the transmit electrode 103, and the other output terminal of the inverter circuit 102 is connected to an output terminal P1 of the transmit apparatus 10. The receive apparatus 20 includes one receive electrode 203 and a rectifier circuit 201. One input terminal of the rectifier circuit 201 is connected to the receive electrode 203, the other input terminal of the rectifier circuit 201 is connected to an input terminal P2 of the receive apparatus 20, and an output terminal of the rectifier circuit 201 is connected to a load 202. The transmit electrode 103 is coupled to the receive electrode 203 through a power transmission medium 50, where electric conductivity of the power transmission medium 50 is greater than electric conductivity of air.

The inverter circuit 102 converts, into an alternating current, a direct current input by the direct-current power supply 101 and then outputs the alternating current through the two output terminals of the inverter circuit 102, so that the transmit electrode 103 and the output terminal P1 of the transmit apparatus 10 generate an electric field. The receive electrode 203 and the input terminal P2 of the receive apparatus 20 generate an alternating current under the action of the electric field and transmit the generated alternating current to the rectifier circuit 201; and the rectifier circuit 201 converts the input alternating current into a direct current and outputs the direct current to the load 202, so as to supply power to the load 202.

It should be noted that the transmit apparatus 10 belongs to a wireless charging transmit device, and the receive apparatus 20 belongs to a wireless charging receive device. The wireless charging transmit device is configured to charge the wireless charging receive device. The wireless charging transmit device and the wireless charging receive device may be various types of electronic devices. That is, the transmit apparatus 10 and the receive apparatus 20 may be disposed in various types of electronic devices. For example, the transmit apparatus 10 and the receive apparatus 20 may be disposed in electronic devices such as a handheld electronic device, a wearable electronic device, a desktop electronic device, or a wall-mounted electronic device. These electronic devices may include a mobile phone, a smart watch, a smart ring, a mobile power pack, a computer, a monitoring device, a sensor, and the like.

In addition, the direct-current power supply 101 may provide power. For example, the direct-current power supply 101 may be an independently disposed power module, or may be a battery of the wireless charging transmit device, or the like. This is not limited in this embodiment of this application. The load 202 may receive the power. For example, the load 202 may be an LED lamp, a chip, a battery of the wireless charging receive device, or the like. This is not limited in this embodiment of this application.

In addition, the power transmission medium 50 may be metal or a non-metallic dielectric. For example, the power transmission medium 50 may be metal such as iron, aluminum, copper, an alloy material, a metal pipe, a metal housing of a device, a metal structure of a building, or a ground grid, or may be a non-metallic dielectric such as a human body, an animal, soil, earth, or seawater provided that electric conductivity of the metal or the non-metallic dielectric is greater than the electric conductivity of the air.

It should be noted that the inverter circuit 102 is configured to convert a direct current into an alternating current, and may also be referred to as a direct current-alternating current conversion circuit. The rectifier circuit 201 is configured to convert an alternating current into a direct current, and may also be referred to as an alternating current-direct current conversion circuit. The inverter circuit 102 converts, into the alternating current, the direct current input by the direct-current power supply 101 and then outputs the alternating current through the two output terminals of the inverter circuit 102. In this case, voltage is generated between the transmit electrode 103 and the output terminal P1 of the transmit apparatus 10, to form an electric field around the transmit electrode 103 and the output terminal P1 of the transmit apparatus 10. Inducting voltage is generated between the receive electrode 203 and the input terminal P2 of the receive apparatus 20 under the action of the electric field; and in this way, the alternating current is generated between the receive electrode 203 and the input terminal P2 of the receive apparatus 20. The rectifier circuit 201 converts the alternating current in the receive electrode 203 and the input terminal P2 of the receive apparatus 20 into a direct current and then outputs the direct current to the load 202, so as to supply power to the load 202, thereby implementing wireless charging for the receive apparatus 20 by the transmit apparatus 10.

It should be noted that, in a possible implementation, the inverter circuit 102 may convert, into a high-frequency alternating current, the direct current input by the direct-current power supply 101 and then output the high-frequency alternating current through the two output terminals of the inverter circuit 102. In this way, the transmit electrode 103 and the output terminal P1 of the transmit apparatus 10 generate a high-frequency electric field. The receive electrode 203 and the input terminal P2 of the receive apparatus 20 generate a high-frequency alternating current under the action of the high-frequency electric field; and the rectifier circuit 201 may convert the high-frequency alternating current into a direct current applicable to the load 202 and outputs the direct current to the load 202, so as to supply power to the load 202.

In addition, when the wireless charging system in this embodiment of this application is actually used, a ground point may not be disposed. That is, the wireless charging system may be an integral suspended structure. In addition, to implement charging, the transmit electrode 103 in the transmit apparatus 10 does not need to be placed directly opposite to the receive electrode 203 in the receive apparatus 20, thereby improving flexibility of wireless charging.

It should be noted that, both the transmit electrode 103 and the receive electrode 203 are coupled to the power transmission medium 50, to form a power transmission path.

Both the output terminal P1 of the transmit apparatus 10 and the input terminal P2 of the receive apparatus 20 are coupled to the air, to form another power transmission path. The two power transmission paths form a power loop. In this case, after the transmit electrode 103 and the output terminal P1 of the transmit apparatus 10 generate the electric field, inducting voltage is generated between the receive electrode 203 and the input terminal P2 of the receive apparatus 20 due to the electric field, so as to generate the alternating current between the receive electrode 203 and the input terminal P2 of the receive apparatus 20.

It should be noted that transmission power between the transmit apparatus 10 and the receive apparatus 20 is directly proportional to an operating frequency of a system, equivalent coupling capacitance between the transmit electrode 103 and the receive electrode 203, output voltage of the transmit apparatus 10, and input voltage of the receive apparatus 20, and therefore increasing the equivalent coupling capacitance between the transmit electrode 103 and the receive electrode 203 can effectively increase the transmission power between the transmit apparatus 10 and the receive apparatus 20, so as to implement wireless charging over a relatively long distance. In this embodiment of this application, the transmit electrode 103 can be coupled to the receive electrode 203 through the power transmission medium 50. Because the electric conductivity of the power transmission medium 50 is greater than the electric conductivity of the air, that is, the power transmission medium 50 has higher electric conductivity, the equivalent coupling capacitance between the transmit electrode 103 and the receive electrode 203 can be increased, thereby effectively increasing a wireless charging transmission distance and improving flexibility of wireless charging.

In addition, in this embodiment of this application, the transmit apparatus 10 needs to include only one transmit electrode 103, and the receive apparatus 20 needs to include only one receive electrode 203, to implement wireless charging for the receive apparatus 20 by the transmit apparatus 10, thereby effectively reducing costs, volumes, and weight of the transmit apparatus 10 and the receive apparatus 20 and further improving flexibility of wireless charging.

Figure 9:
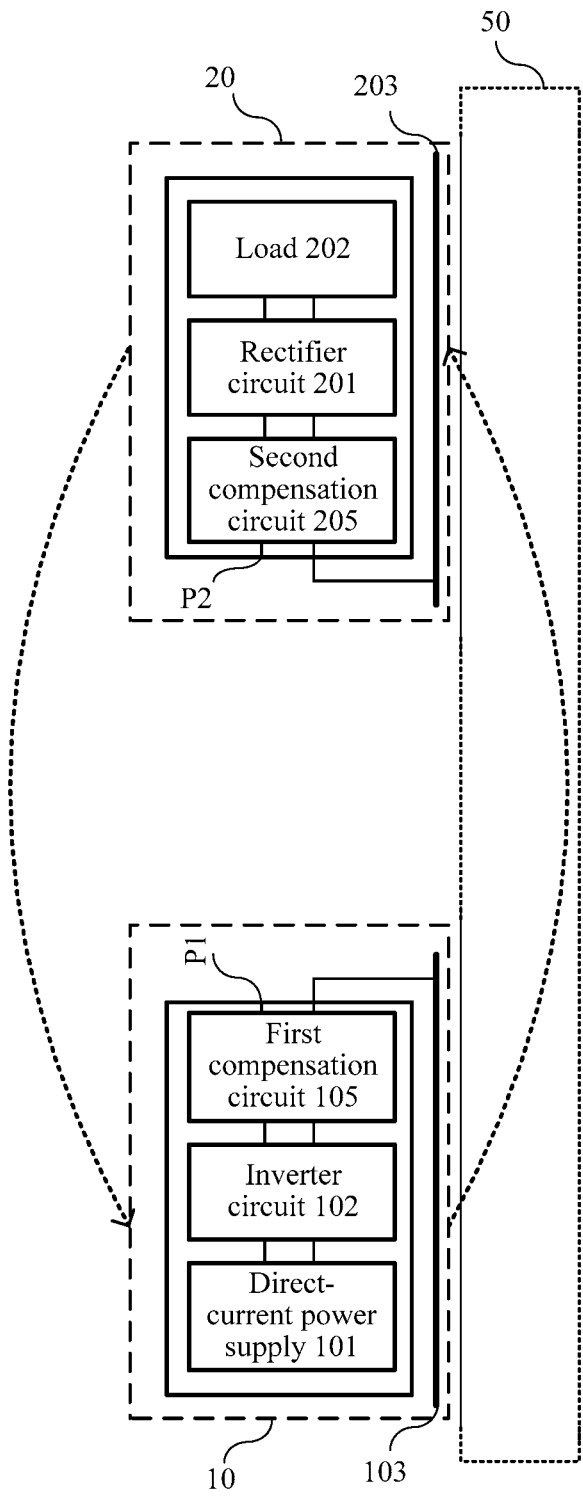
FIG. 9 is a schematic structural diagram of a fifth wireless charging system according to an embodiment of this application.

Further, referring to FIG. 9, the transmit apparatus 10 may further include a first compensation circuit 105, the first compensation circuit 105 is connected between the inverter circuit 102 and the transmit electrode 103, and is connected between the inverter circuit 102 and the output terminal P1 of the transmit apparatus 10, and the first compensation circuit 105 is configured to compensate for capacitive reactance between the transmit apparatus 10 and the receive apparatus 20. Further, referring to FIG. 9, the receive apparatus 20 may further include a second compensation circuit 205, the second compensation circuit 205 is connected between the receive electrode 203 and the rectifier circuit 201, and is connected between the input terminal P2 of the receive apparatus 20 and the rectifier circuit 201, and the second compensation circuit 205 is configured to compensate for capacitive reactance between the receive apparatus 20 and the transmit apparatus 10.

It should be noted that two input terminals of the first compensation circuit 105 are connected to two output terminals of the inverter circuit 102 respectively, one output terminal of the first compensation circuit 105 is connected to the transmit electrode 103, and the other output terminal of the first compensation circuit 105 is connected to the output terminal P1 of the transmit apparatus 10. One input terminal of the second compensation circuit 205 is connected to the receive electrode 203, and the other input terminal of the second compensation circuit 205 is connected to the input terminal P2 of the receive apparatus 20, and the two output terminals of the second compensation circuit 205 are connected to the two input terminals of the rectifier circuit 201 respectively. The first compensation circuit 105 can reduce a reactive power loss in the transmit apparatus 10, and the second compensation circuit 205 can reduce a reactive power loss in the receive apparatus 20, thereby improving power transmission efficiency.

Further, the first compensation circuit 105 can also increase voltage of an alternating current output by the inverter circuit 102 to increase output voltage of the transmit apparatus 10, thereby further increasing input voltage of the receive apparatus 20. In this case, voltage of an alternating current generated in the receive electrode 203 and the input terminal P2 of the receive apparatus 20 is relatively high, and therefore the second compensation circuit 205 may further decrease the voltage of the alternating current generated in the receive electrode 203 and the input terminal P2 of the receive apparatus 20.

For example, after the inverter circuit 102 converts, into a high-frequency low-voltage alternating current, the direct current input by the direct-current power supply 101, the first compensation circuit 105 can convert the high-frequency low-voltage alternating current into a high-frequency high-voltage alternating current and then apply the high-frequency high-voltage alternating current to the transmit electrode 103 and the output terminal P1 of the transmit apparatus 10 to generate a high-frequency electric field. In this case, the receive electrode 203 and the input terminal P2 of the receive apparatus 20 generate a high-frequency high-voltage alternating current under the action of the high-frequency electric field, the second compensation circuit 205 converts the high-frequency high-voltage alternating current into a high-frequency low-voltage alternating current, and the rectifier circuit 201 converts the high-frequency low-voltage alternating current into a direct current applicable to the load 202 and outputs the direct current to the load 202, so as to supply power to the load 202.

It should be noted that the first compensation circuit 105 may be a boost circuit or a boost apparatus when the first compensation circuit 105 can also increase the voltage of the alternating current output by the inverter circuit 102. For example, the first compensation circuit 105 may be an LC resonance boost circuit, a planar spiral boost coil, a transformer, or the like. This is not limited in this embodiment of this application. The second compensation circuit 205 may be a buck circuit or a buck apparatus when the second compensation circuit 205 can also decrease the voltage of the alternating current generated in the receive electrode 203 and the input terminal P2 of the receive apparatus 20. For example, the second compensation circuit 205 may be an LC resonance buck circuit, a planar spiral buck coil, a transformer, or the like. This is not limited in this embodiment of this application.

For example, the first compensation circuit 105 may be an LC resonance boost circuit shown in FIG. 3, $C_1$ and $C_2$ are compensation capacitors, $L_1$ and $L_2$ are compensation inductors, a terminal A and a terminal B are two input terminals of the first compensation circuit 105, and a terminal C and a terminal D are two output terminals of the first compensation circuit 105. Alternatively, the first compensation circuit 105 may be a planar spiral boost coil shown in FIG. 4, the terminal A and the terminal B are connected to a primary coil at an outermost turn, Cs is a series compensation capacitor of the primary coil, the terminal C and the terminal D are connected to a multi-turn secondary coil, Cp is a parallel compensation capacitor of the secondary coil, the terminal A and the terminal B are the two input terminals of the first compensation circuit 105, and the terminal C and the terminal D are two output terminals of the first compensation circuit 105.

For another example, the second compensation circuit 205 may be an LC resonance buck circuit shown in FIG. 5, $C_1$ and $C_2$ are compensation capacitors, $L_1$ and $L_2$ are compensation inductors, a terminal A and a terminal B are two input terminals of the second compensation circuit 205, and a terminal C and a terminal D are two output terminals of the second compensation circuit 205. Alternatively, the second compensation circuit 205 may be a planar spiral buck coil shown in FIG. 6, the terminal A and the terminal B are connected to a multi-turn secondary coil, Cp is a parallel compensation capacitor of the secondary coil, the terminal C and the terminal D are connected to a primary coil at an outermost turn, Cs is a series compensation capacitor of the primary coil, the terminal A and the terminal B are the two input terminals of the second compensation circuit 205, and the terminal C and the terminal D are two output terminals of the second compensation circuit 205.

It should be noted that transmission power between the transmit apparatus 10 and the receive apparatus 20 is directly proportional to an operating frequency of a system, equivalent coupling capacitance between the transmit electrode 103 and the receive electrode 203, output voltage of the transmit apparatus 10, and input voltage of the receive apparatus 20, and therefore increasing the output voltage of the transmit apparatus 10 and the input voltage of the receive apparatus 20 can effectively increase the transmission power between the transmit apparatus 10 and the receive apparatus 20, so as to implement wireless charging over a relatively long distance. In this embodiment of this application, the first compensation circuit 105 can increase the voltage of the alternating current output by the inverter circuit 102. In this way, a relatively strong electric field can be formed around the transmit electrode 103 and the output terminal P1 of the transmit apparatus 10, thereby effectively increasing a wireless charging transmission distance and improving flexibility of wireless charging.

It should be noted that the transmit electrode 103 may come into direct contact with the power transmission medium 50. Alternatively, the transmit electrode 103 may not come into contact with the power transmission medium 50. That is, there may be some distance between the transmit electrode 103 and the power transmission medium 50. Specifically, the distance between the transmit electrode 103 and the power transmission medium 50 may be greater than 0 and less than a first distance, and the first distance may be preset. When the transmit electrode 103 does not come into contact with the power transmission medium 50, there may be another object between the transmit electrode 103 and the power transmission medium 50. For example, there may be an insulating material between the transmit electrode 103 and the power transmission medium 50. This is not limited in this embodiment of this application.

The transmit electrode 103 may be made of metal such as iron, aluminum, copper, or alloy. In actual application, the transmit electrode 103 may be an independently disposed component. Alternatively, the transmit electrode 103 may be at least a portion of a metal structural part of the wireless charging transmit device. In this case, the transmit electrode 103 may come into direct contact with the power transmission medium 50. Certainly, the transmit electrode 103 may alternatively not come into contact with the power transmission medium 50, and the metal structural part may be a metal housing, a metal frame, or the like. Alternatively, the transmit electrode 103 may be located on an inner side of a housing of the wireless charging transmit device. In this case, the housing of the wireless charging transmit device is located between the transmit electrode 103 and the power transmission medium 50. The housing may be made of an insulating material, metal, or the like.

Similarly, the receive electrode 203 may come into direct contact with the power transmission medium 50. Alternatively, the receive electrode 203 may not come into contact with the power transmission medium 50. That is, there may be some distance between the receive electrode 203 and the power transmission medium 50. Specifically, the distance between the receive electrode 203 and the power transmission medium 50 may be greater than 0 and less than a second distance, and the second distance may be preset. When the receive electrode 203 does not come into contact with the power transmission medium 50, there may be another object between the receive electrode 203 and the power transmission medium 50. For example, there may be an insulating material between the receive electrode 203 and the power transmission medium 50. This is not limited in this embodiment of this application.

The receive electrode 203 may be made of metal such as iron, aluminum, copper, or alloy. In actual application, the receive electrode 203 may be an independently disposed component. Alternatively, the receive electrode 203 may be at least a portion of a metal structural part of the wireless charging receive device. In this case, the receive electrode 203 may come into direct contact with the power transmission medium 50. Certainly, the receive electrode 203 may alternatively not come into contact with the power transmission medium 50, and the metal structural part may be a metal housing, a metal frame, or the like. Alternatively, the receive electrode 203 may be located on an inner side of a housing of the wireless charging receive device. In this case, the housing of the wireless charging receive device is located between the receive electrode 203 and the power transmission medium 50. The housing may be made of an insulating material, metal, or the like.

In this embodiment of this application, the wireless charging system includes the transmit apparatus 10 and the receive apparatus 20. The transmit apparatus 10 includes the inverter circuit 102 and the one transmit electrode 103. The receive apparatus 20 includes the one receive electrode 203 and the rectifier circuit 201. The inverter circuit 102 converts, into an alternating current, the direct current input by the direct-current power supply 101 and then outputs the alternating current through the two output terminals of the inverter circuit 102, so that the transmit electrode 103 and the output terminal P1 of the transmit apparatus 10 generate an electric field. The receive electrode 203 and the input terminal P2 of the receive apparatus 20 generate an alternating current under the action of the electric field and transmit the generated alternating current to the rectifier circuit 201; and the rectifier circuit 201 converts the input alternating current into a direct current and outputs the direct current to the load 202, so as to supply power to the load 202. Because the transmit electrode 103 is coupled to the receive electrode 203 through the power transmission medium 50 whose electric conductivity is greater than the electric conductivity of the air, the equivalent coupling capacitance between the transmit electrode 103 and the receive electrode 203 can be increased, thereby effectively increasing a wireless charging transmission distance and improving flexibility of wireless charging.

Figure 10:
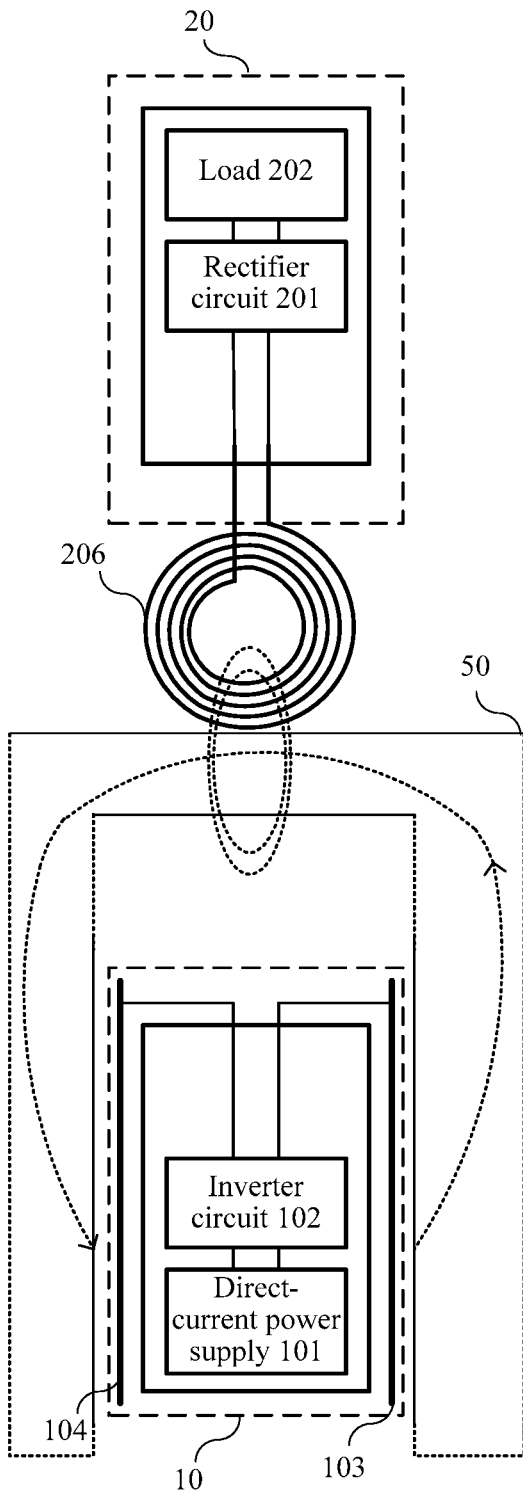
FIG. 10 is a schematic structural diagram of a sixth wireless charging system according to an embodiment of this application.

FIG. 10 is a schematic structural diagram of a wireless charging system according to an embodiment of this application. Referring to FIG. 10, the system includes a transmit apparatus 10 and a receive apparatus 20.

The transmit apparatus 10 includes an inverter circuit 102 and two transmit electrodes (103 and 104 shown in the figure). An input terminal of the inverter circuit 102 is connected to a direct-current power supply 101, and two output terminals of the inverter circuit 102 are connected to the two transmit electrodes respectively. The two transmit electrodes are coupled through a power transmission medium 50, where electric conductivity of the power transmission medium 50 is greater than electric conductivity of air. The receive apparatus 20 includes a receive coil 206 and a rectifier circuit 201, an input terminal of the rectifier circuit 201 is connected to the receive coil 206, and an output terminal of the rectifier circuit 201 is connected to a load 202.

The inverter circuit 102 converts, into an alternating current, a direct current input by the direct-current power supply 101 and then outputs the alternating current to the two transmit electrodes, so that an alternating current is generated in the power transmission medium 50 between the two transmit electrodes. The alternating current in the power transmission medium 50 excites a magnetic field. The receive coil 206 generates an alternating current under the action of the magnetic field and transmits the generated alternating current to the rectifier circuit 201; and the rectifier circuit 201 converts the input alternating current into a direct current and outputs the direct current to the load 202, so as to supply power to the load 202.

It should be noted that the transmit apparatus 10 belongs to a wireless charging transmit device, and the receive apparatus 20 belongs to a wireless charging receive device. The wireless charging transmit device is configured to charge the wireless charging receive device. The wireless charging transmit device and the wireless charging receive device may be various types of electronic devices. That is, the transmit apparatus 10 and the receive apparatus 20 may be disposed in various types of electronic devices. For example, the transmit apparatus 10 and the receive apparatus 20 may be disposed in electronic devices such as a handheld electronic device, a wearable electronic device, a desktop electronic device, or a wall-mounted electronic device. These electronic devices may include a mobile phone, a smart watch, a smart ring, a mobile power pack, a computer, a monitoring device, a sensor, and the like.

In addition, the direct-current power supply 101 may provide power. For example, the direct-current power supply 101 may be an independently disposed power module, or may be a battery of the wireless charging transmit device, or the like. This is not limited in this embodiment of this application. The load 202 may receive the power. For example, the load 202 may be an LED lamp, a chip, a battery of the wireless charging receive device, or the like. This is not limited in this embodiment of this application.

In addition, the power transmission medium 50 may be metal or a non-metallic dielectric. For example, the power transmission medium 50 may be metal such as iron, aluminum, copper, an alloy material, a metal pipe, a metal housing of a device, a metal structure of a building, or a ground grid, or may be a non-metallic dielectric such as a human body, an animal, soil, earth, or seawater provided that electric conductivity of the metal or the non-metallic dielectric is greater than the electric conductivity of the air.

It should be noted that the inverter circuit 102 is configured to convert a direct current into an alternating current, and may also be referred to as a direct current-alternating current conversion circuit. The rectifier circuit 201 is configured to convert an alternating current into a direct current, and may also be referred to as an alternating current-direct current conversion circuit. The inverter circuit 102 converts, into the alternating current, the direct current input by the direct-current power supply 101 and then outputs the alternating current to the two transmit electrodes. In this case, voltage is generated between the two transmit electrodes. Because electric conductivity of the power transmission medium 50 between the two transmit electrodes is greater than electric conductivity of air, an alternating current is generated in the power transmission medium 50, and the alternating current excites a magnetic field around the power transmission medium 50. An alternating current is induced in the receive coil 206 under the action of the magnetic field. The rectifier circuit 201 may convert the alternating current in the receive coil 206 into a direct current and then outputs the direct current to the load 202, so as to supply power to the load 202, thereby implementing wireless charging for the receive apparatus 20 by the transmit apparatus 10.

It should be noted that, in a possible implementation, the inverter circuit 102 may convert, into a high-frequency alternating current, the direct current input by the direct-current power supply 101 and then output the high-frequency alternating current to the two transmit electrodes. In this way, a high-frequency alternating current is generated in the power transmission medium 50 between the two transmit electrodes, and the high-frequency alternating current excites a high-frequency magnetic field. The receive coil 206 generates a high-frequency alternating current under the action of the high-frequency magnetic field; and the rectifier circuit 201 may convert the high-frequency alternating current into a direct current applicable to the load 202 and outputs the direct current to the load 202, so as to supply power to the load 202.

In addition, when the wireless charging system in this embodiment of this application is actually used, a ground point may not be disposed. That is, the wireless charging system may be an integral suspended structure, thereby improving flexibility of wireless charging.

It should be noted that, in this embodiment of this application, the two transmit electrodes in the transmit apparatus 10 may be coupled through the power transmission medium 50 whose electric conductivity is greater than the electric conductivity of the air; and in this way, an alternating current may be generated in the power transmission medium 50, and the alternating current can excite the magnetic field. The alternating current is generated in the receive coil 206 of the receive apparatus 20 through electromagnetic induction, to implement wireless charging, thereby improving flexibility of wireless charging.

Figure 11:
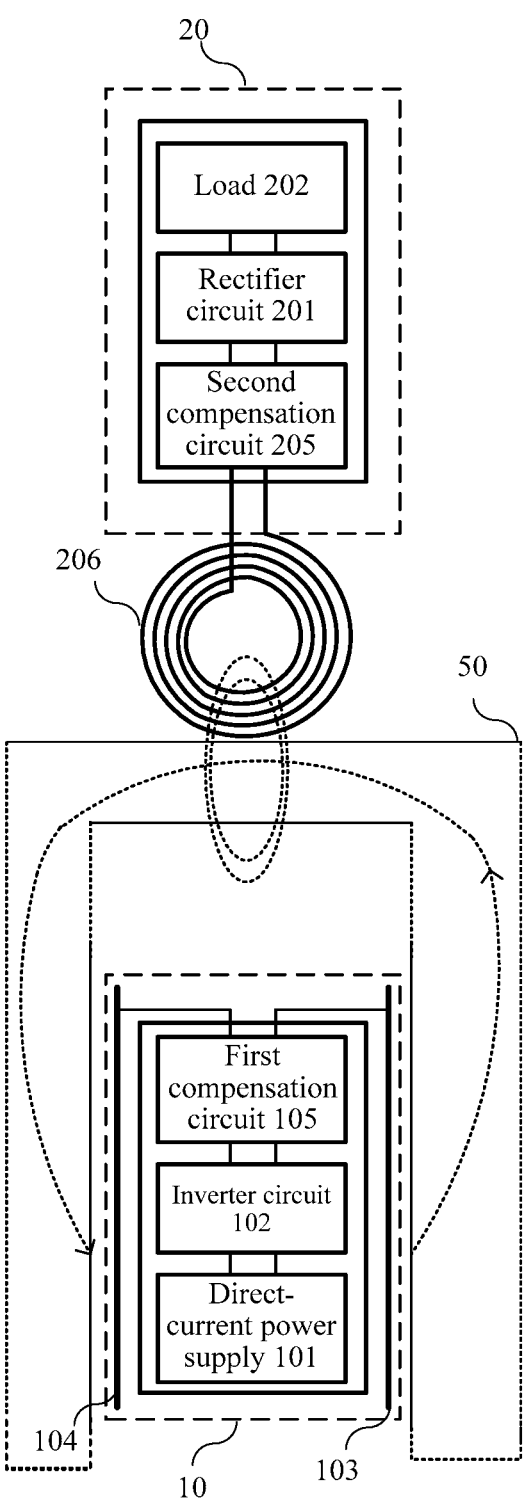
FIG. 11 is a schematic structural diagram of a seventh wireless charging system according to an embodiment of this application.

Further, referring to FIG. 11, the transmit apparatus 10 may further include a first compensation circuit 105, the first compensation circuit 105 is connected between the inverter circuit 102 and the two transmit electrodes, and is configured to compensate for capacitive reactance between the two transmit electrodes. Further, referring to FIG. 11, the receive apparatus 20 may further include a second compensation circuit 205, the second compensation circuit 205 is connected between the receive coil 206 and the rectifier circuit 201, and is configured to compensate for inductive reactance of the receive coil 206.

It should be noted that two input terminals of the first compensation circuit 105 are connected to two output terminals of the inverter circuit 102 respectively, and the two output terminals of the first compensation circuit 105 are connected to the two transmit electrodes respectively. Two input terminals of the second compensation circuit 205 are connected to the receive coil 206, and the two output terminals of the second compensation circuit 205 are connected to the two input terminals of the rectifier circuit 201 respectively. The first compensation circuit 105 can reduce a reactive power loss in the transmit apparatus 10, and the second compensation circuit 205 can reduce a reactive power loss in the receive apparatus 20, thereby improving power transmission efficiency.

In addition, the receive coil 206 may be formed by winding a conducting wire such as a copper wire or a litz wire. In addition, a magnetic conductive plate may be placed below the receive coil 206. The magnetic conductive plate has a magnetic conductive function, and can increase magnetic flux received by the receive coil 206. The magnetic conductive plate may be made of at least one magnetic material, such as ferrite, amorphous, or nano-crystal. This is not limited in this embodiment of this application. The second compensation circuit 205 may be implemented by connecting a single capacitor or a plurality of capacitors to an inductor in series or in parallel.

It should be noted that, for either of the two transmit electrodes, such as the transmit electrode 103 or the transmit electrode 104, the transmit electrode may come into direct contact with the power transmission medium 50. Alternatively, the transmit electrode may not come into contact with the power transmission medium 50. That is, there may be some distance between the transmit electrode and the power transmission medium 50. Specifically, the distance between the transmit electrode and the power transmission medium 50 may be greater than 0 and less than a reference distance, and the reference distance may be preset. When the transmit electrode does not come into contact with the power transmission medium 50, there may be another object between the transmit electrode and the power transmission medium 50. For example, there may be an insulating material between the transmit electrode and the power transmission medium 50. This is not limited in this embodiment of this application.

In other words, at least one transmit electrode of the two transmit electrodes may come into contact with the power transmission medium 50; or a distance between at least one transmit electrode of the two transmit electrodes and the power transmission medium 50 may be greater than 0 and less than a reference distance; or one transmit electrode 103 in the two transmit electrodes may come into contact with the power transmission medium 50, and a distance between the other transmit electrode 104 and the power transmission medium 50 may be greater than 0 and less than the reference distance.

Both the transmit electrode 103 and the transmit electrode 104 may be made of metal such as iron, aluminum, copper, or alloy. In actual application, at least one transmit electrode of the two transmit electrodes may be an independently disposed component. Alternatively, at least one transmit electrode of the two transmit electrodes may be at least a portion of a metal structural part of the wireless charging transmit device. In this case, the at least one transmit electrode may come into direct contact with the power transmission medium 50. Certainly, the at least one transmit electrode may alternatively not come into contact with the power transmission medium 50, and the metal structural part may be a metal frame, a metal housing, or the like. Alternatively, at least one transmit electrode of the two transmit electrodes may be located on an inner side of a housing of the wireless charging transmit device. In this case, the housing of the wireless charging transmit device is located between the at least one transmit electrode and the power transmission medium 50. The housing may be made of an insulating material, metal, or the like. Alternatively, the transmit electrode 103 in the two transmit electrodes may be at least a portion of the metal structural part of the wireless charging transmit device, and the other transmit electrode 104 may be located on an inner side of the housing of the wireless charging transmit device.

In this embodiment of this application, the wireless charging system includes the transmit apparatus 10 and the receive apparatus 20. The transmit apparatus 10 includes the inverter circuit 102 and the two transmit electrodes. The receive apparatus 20 includes the receive coil 206 and the rectifier circuit 201. The inverter circuit 102 converts, into an alternating current, a direct current input by the direct-current power supply 101 and then outputs the alternating current to the two transmit electrodes. Because the two transmit electrodes are coupled through the power transmission medium 50 whose electric conductivity is greater than the electric conductivity of the air; and in this way, an alternating current is generated in the power transmission medium 50 between the two transmit electrodes, and the alternating current in the power transmission medium 50 excites the magnetic field. The receive coil 206 generates an alternating current under the action of the magnetic field, and transmits the generated alternating current to the rectifier circuit 201. The rectifier circuit 201 converts the input alternating current into a direct current and then outputs the direct current to the load 202, so as to supply power to the load 202, thereby implementing wireless charging for the receive apparatus 20 by the transmit apparatus 10, thereby improving flexibility of wireless charging.

For ease of understanding, the foregoing wireless charging system is described by using an example with reference to a specific application scenario.

Figure 12:
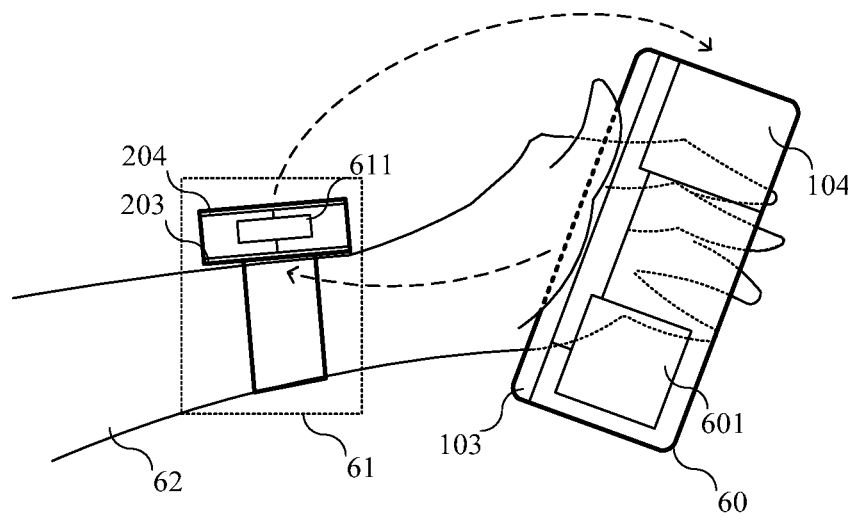
FIG. 12 is a schematic diagram of a first type of wireless charging according to an embodiment of this application.
Figure 13:
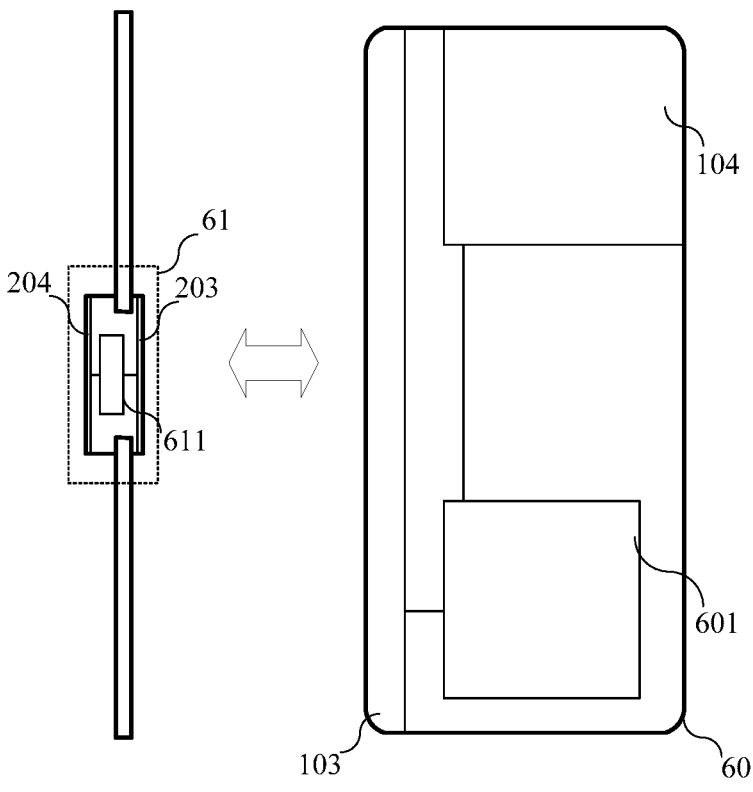
FIG. 13 is a schematic diagram of an internal structure of a first apparatus according to an embodiment of this application.

A first possible application scenario is as follows:

FIG. 12 and FIG. 13 are schematic diagrams of an application scenario of the wireless charging system provided in the embodiment of FIG. 1, which is specifically an application scenario in which a handheld mobile phone 60 is used to wirelessly charge a smart watch 61 worn on a wrist.

FIG. 12 is a schematic diagram of wireless charging. As shown in FIG. 12, the mobile phone 60 is a transmit apparatus 10, and may include an internal circuit 601 of the transmit apparatus, a transmit electrode 103, and a transmit electrode 104. The internal circuit 601 of the transmit apparatus may include a direct-current power supply 101 and an inverter circuit 102, and may further include a first compensation circuit 105. The smart watch 61 is a receive apparatus 20, and may include an internal circuit 611 of the receive apparatus, a receive electrode 203, and a receive electrode 204. The internal circuit 611 of the receive apparatus may include a rectifier circuit 201 and a load 202, and may further include a second compensation circuit 205.

When a user 62 holds the mobile phone 60 and wears the smart watch 61 on the wrist, the transmit electrode 103 and the receive electrode 203 are coupled through a body of the user 62, to form a power transmission path. The transmit electrode 104 and the receive electrode 204 are coupled through the air, to form another power transmission path. The two power transmission paths form a power loop, so as to implement wireless power transmission.

FIG. 13 is a schematic diagram of an internal structure of an apparatus. As shown in FIG. 13, the transmit electrode 103 in the mobile phone 60 may be metal foil, metal mesh, or the like, and is disposed at a location, inside or on a surface of the mobile phone 60, corresponding to a contact location between the mobile phone 60 and a palm. To increase a coupling degree between the transmit electrode 103 and the palm, a directly-opposite area between the transmit electrode 103 and the palm can be maximized by setting an area and a shape of the transmit electrode 103. The transmit electrode 103 may not need to come into direct contact with the body of the user 62. To be specific, an insulating material may be added between the transmit electrode 103 and the body of the user 62, or the transmit electrode 103 may be spaced some distance apart from the body of the user 62. The transmit electrode 104 and the transmit electrode 103 in the mobile phone 60 may be made of a same material or different materials, and the transmit electrode 104 may be disposed inside or on the surface of the mobile phone 60. To enhance a coupling degree between the transmit electrode 104 and the receive electrode 204, an area of the transmit electrode 104 should be maximized, and a directly-opposite area between the transmit electrode 104 and the transmit electrode 103 should be reduced, so as to reduce a coupling degree between the transmit electrode 104 and the transmit electrode 103.

The receive electrode 203 in the smart watch 61 may be metal foil, metal mesh, or the like, and is disposed at a location, inside or on a bottom cover surface of the smart watch 61, corresponding to a contact location between the smart watch 61 and the wrist. Certainly, the receive electrode 203 may alternatively be directly at least a portion of a metal frame or metal bottom cover of the smart watch 61 that comes into contact with the wrist. To increase a coupling degree between the receive electrode 203 and the wrist, a directly-opposite area between the receive electrode 203 and the wrist can be maximized by setting an area and a shape of the receive electrode 203. The receive electrode 203 may not need to come into direct contact with the body of the user 62. To be specific, an insulating material may be added between the receive electrode 203 and the body of the user 62, or the receive electrode 203 may be spaced some distance apart from the body of the user 62. The receive electrode 204 and the receive electrode 203 in the smart watch 61 may be made of a same material or different materials, and the receive electrode 204 may be disposed inside or on the surface of the smart watch 61. Certainly, the receive electrode 204 may alternatively be directly at least a portion of the metal watch face. To enhance a coupling degree between the receive electrode 204 and the transmit electrode 104, an area of the receive electrode 204 should be maximized, and a directly-opposite area between the receive electrode 204 and the receive electrode 203 should be reduced, so as to reduce a coupling degree between the receive electrode 204 and the receive electrode 203.

Figure 14:
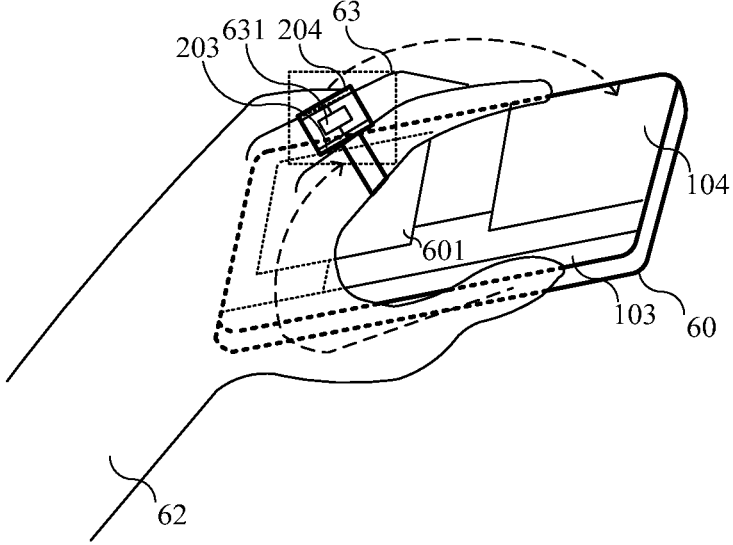
FIG. 14 is a schematic diagram of a second type of wireless charging according to an embodiment of this application.
Figure 15:
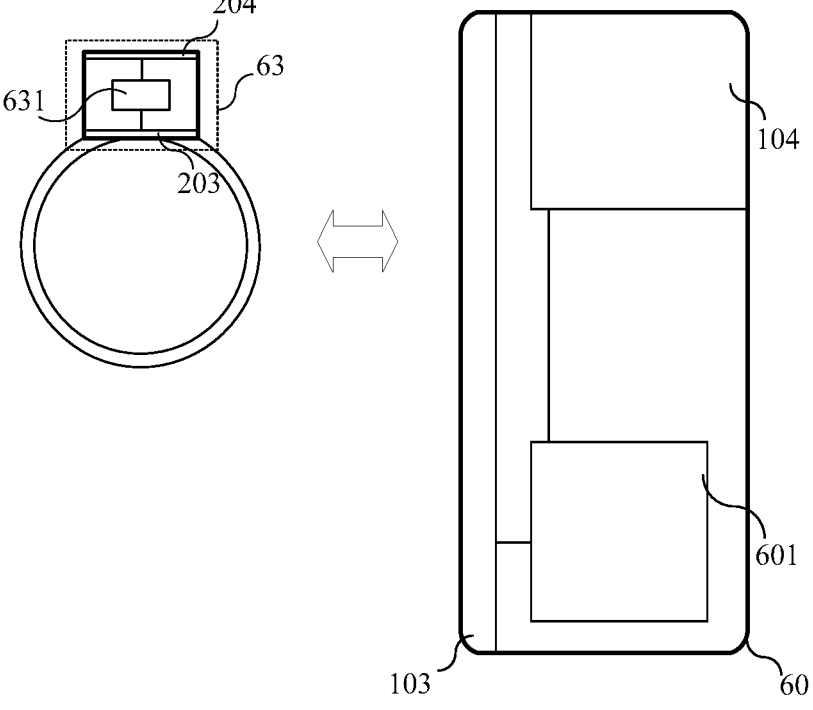
FIG. 15 is a schematic diagram of an internal structure of a second apparatus according to an embodiment of this application.

A second possible application scenario is as follows:

FIG. 14 and FIG. 15 are schematic diagrams of an application scenario of the wireless charging system provided in the embodiment of FIG. 1, which is specifically an application scenario in which a handheld mobile phone 60 is used to wirelessly charge a smart ring 63 worn on a finger.

FIG. 14 is a schematic diagram of wireless charging. As shown in FIG. 14, the mobile phone 60 is a transmit apparatus 10, and may include an internal circuit 601 of the transmit apparatus, a transmit electrode 103, and a transmit electrode 104. The internal circuit 601 of the transmit apparatus may include a direct-current power supply 101 and an inverter circuit 102, and may further include a first compensation circuit 105. The smart ring 63 is a receive apparatus 20, and may include an internal circuit 631 of the receive apparatus, a receive electrode 203, and a receive electrode 204. The internal circuit 631 of the receive apparatus may include a rectifier circuit 201 and a load 202, and may further include a second compensation circuit 205.

When a user 62 holds the mobile phone 60 and wears the smart ring 63 on the finger, the transmit electrode 103 and the receive electrode 203 establish coupling through a body of the user 62, to form a power transmission path. The transmit electrode 104 and the receive electrode 204 are coupled through the air, to form another power transmission path. The two power transmission paths form a power loop, so as to implement wireless power transmission.

FIG. 15 is a schematic diagram of an internal structure of an apparatus. As shown in FIG. 15, a structure of a mobile phone 60 is similar to the structure of the mobile phone 60 in the foregoing first possible application scenario. Details are not described again in this embodiment of this application.

A receive electrode 203 in a smart ring 63 may be metal foil, metal mesh, or the like, and is disposed at a location, inside or on an inner surface of the smart ring 63, corresponding to a contact location between the smart ring 63 and a finger. To increase a coupling degree between the receive electrode 203 and the finger, a directly-opposite area between the receive electrode 203 and the finger can be maximized by setting an area and a shape of the receive electrode 203. The receive electrode 203 may not need to come into direct contact with the body of the user 62. To be specific, an insulating material may be added between the receive electrode 203 and the body of the user 62, or the receive electrode 203 may be spaced some distance apart from the body of the user 62. The receive electrode 204 and the receive electrode 203 in the smart ring 63 may be made of a same material or different materials, and the receive electrode 204 may be disposed inside or on an outer surface of the smart ring 63. To enhance a coupling degree between the receive electrode 204 and the transmit electrode 104, an area of the receive electrode 204 should be maximized, and a directly-opposite area between the receive electrode 204 and the receive electrode 203 should be reduced, so as to reduce a coupling degree between the receive electrode 204 and the receive electrode 203.

Figure 16:
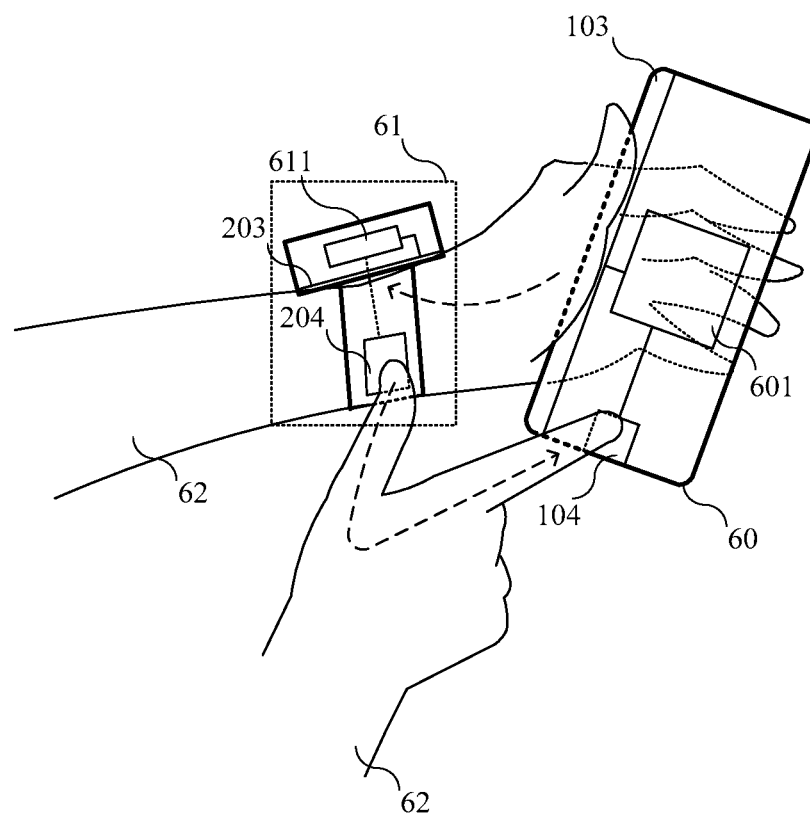
FIG. 16 is a schematic diagram of a third type of wireless charging according to an embodiment of this application.
Figure 17:
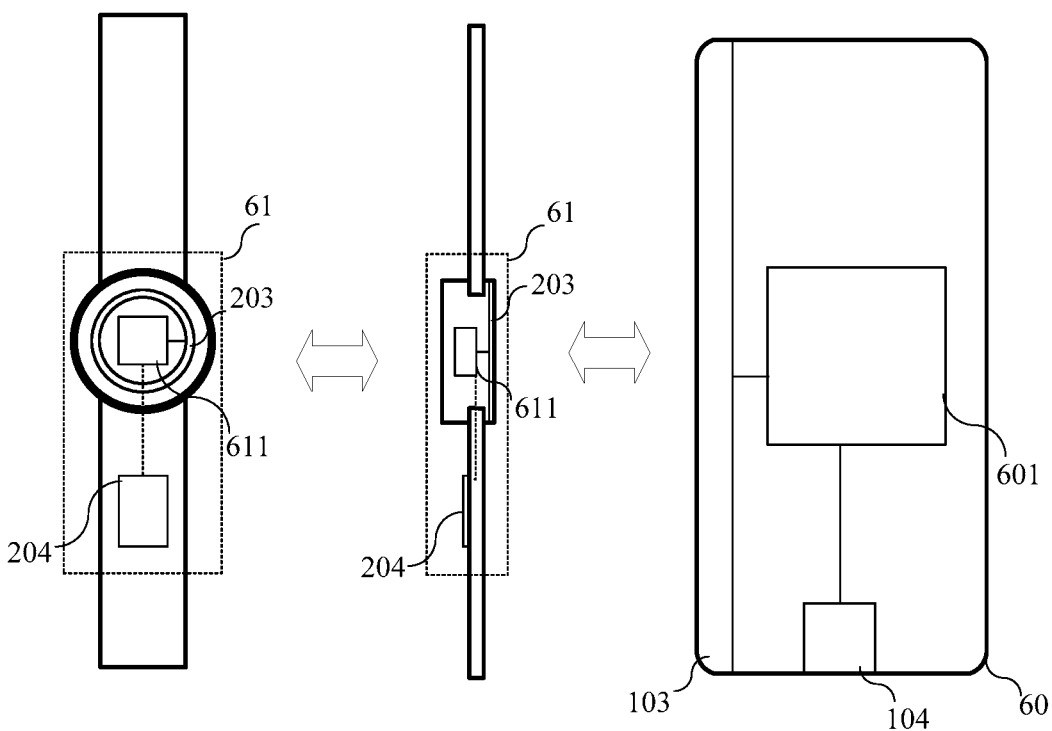
FIG. 17 is a schematic diagram of an internal structure of a third apparatus according to an embodiment of this application.

A third possible application scenario is as follows:

FIG. 16 and FIG. 17 are schematic diagrams of an application scenario of the wireless charging system provided in the embodiment of FIG. 1, which is specifically an application scenario in which a handheld mobile phone 60 is used to wirelessly charge a smart watch 61 worn on a wrist.

A difference from the foregoing first possible application scenario lies in that a thumb and an index finger of the other hand come in contact with the transmit electrode 104 and the receive electrode 204 respectively, thereby increasing a coupling degree between the transmit apparatus 10 and the receive apparatus 20.

FIG. 16 is a schematic diagram of wireless charging. As shown in FIG. 16, the mobile phone 60 is a transmit apparatus 10, and may include an internal circuit 601 of the transmit apparatus, a transmit electrode 103, and a transmit electrode 104. The internal circuit 601 of the transmit apparatus may include a direct-current power supply 101 and an inverter circuit 102, and may further include a first compensation circuit 105. The smart watch 61 is a receive apparatus 20, and may include an internal circuit 611 of the receive apparatus, a receive electrode 203, and a receive electrode 204. The internal circuit 611 of the receive apparatus may include a rectifier circuit 201 and a load 202, and may further include a second compensation circuit 205.

When a user 62 holds the mobile phone 60 and wears the smart watch 61 on the wrist, the transmit electrode 103 and the receive electrode 203 are coupled through a body of the user 62, to form a power transmission path. The transmit electrode 104 comes in contact with the receive electrode 204 through the thumb and index finger of the other hand, to form another power transmission path. The two power transmission paths form a power loop, so as to implement wireless power transmission.

FIG. 17 is a schematic diagram of an internal structure of an apparatus. As shown in FIG. 17, the transmit electrode 103 in the mobile phone 60 may be metal foil, metal mesh, or the like, and is disposed at a location, inside or on a surface of the mobile phone 60, corresponding to a contact location between the mobile phone 60 and a palm. To increase a coupling degree between the transmit electrode 103 and the palm, a directly-opposite area between the transmit electrode 103 and the palm can be maximized by setting an area and a shape of the transmit electrode 103. The transmit electrode 103 may not need to come into direct contact with the body of the user 62. To be specific, an insulating material may be added between the transmit electrode 103 and the body of the user 62, or the transmit electrode 103 may be spaced some distance apart from the body of the user 62. The transmit electrode 104 and the transmit electrode 103 in the mobile phone 60 may be made of a same material or different materials, and the transmit electrode 104 may be disposed inside or on the surface of the mobile phone 60. A location of the transmit electrode 104 should facilitate an operation by the index finger of the other hand. To increase a coupling degree between the transmit electrode 104 and the index finger, a directly-opposite area between the transmit electrode 104 and the index finger can be maximized by setting an area and a shape of the transmit electrode 104. The transmit electrode 104 may not need to come into direct contact with the index finger of the user 62. To be specific, an insulating material may be added between the transmit electrode 104 and the index finger of the user 62, or the transmit electrode 104 may be spaced some distance apart from the index finger of the user 62.

The receive electrode 203 in the smart watch 61 may be metal foil, metal mesh, or the like, and is disposed at a location, inside or on a bottom cover surface of the smart watch 61, corresponding to a contact location between the smart watch 61 and the wrist. Certainly, the receive electrode 203 may alternatively be directly at least a portion of a metal frame or a metal bottom cover of the smart watch 61 that comes into contact with the wrist. To increase a coupling degree between the receive electrode 203 and the wrist, a directly-opposite area between the receive electrode 203 and the wrist can be maximized by setting an area and a shape of the receive electrode 203. The receive electrode 203 may not need to come into direct contact with the body of the user 62. To be specific, an insulating material may be added between the receive electrode 203 and the body of the user 62, or the receive electrode 203 may be spaced some distance apart from the body of the user 62. The receive electrode 204 and the receive electrode 203 in the smart watch 61 may be made of a same material or different materials, and the receive electrode 204 may be disposed at a watch face or a watch band of the smart watch 61. A location of the receive electrode 204 should facilitate an operation by the thumb of the other hand. To increase a coupling degree between the receive electrode 204 and the thumb, a directly-opposite area between the receive electrode 204 and the thumb can be increased by setting an area and a shape of the receive electrode 204. The receive electrode 204 may not need to come into direct contact with the thumb of the user 62. To be specific, an insulating material may be added between the receive electrode 204 and the thumb of the user 62, or the receive electrode 204 may be spaced some distance apart from the thumb of the user 62.

It should be noted that when the transmit electrode 104 comes in contact with the receive electrode 204 through other parts of a user body to improve the coupling degree between the transmit apparatus 10 and the receive apparatus 20, the other parts of the user body may not be limited to the thumb or the index finger of the other hand of the body, or may be other two fingers (such as the thumb and a little finger) or other parts of the body (such as the palm and a middle finger). This is not limited in this embodiment of this application.

Figure 18:
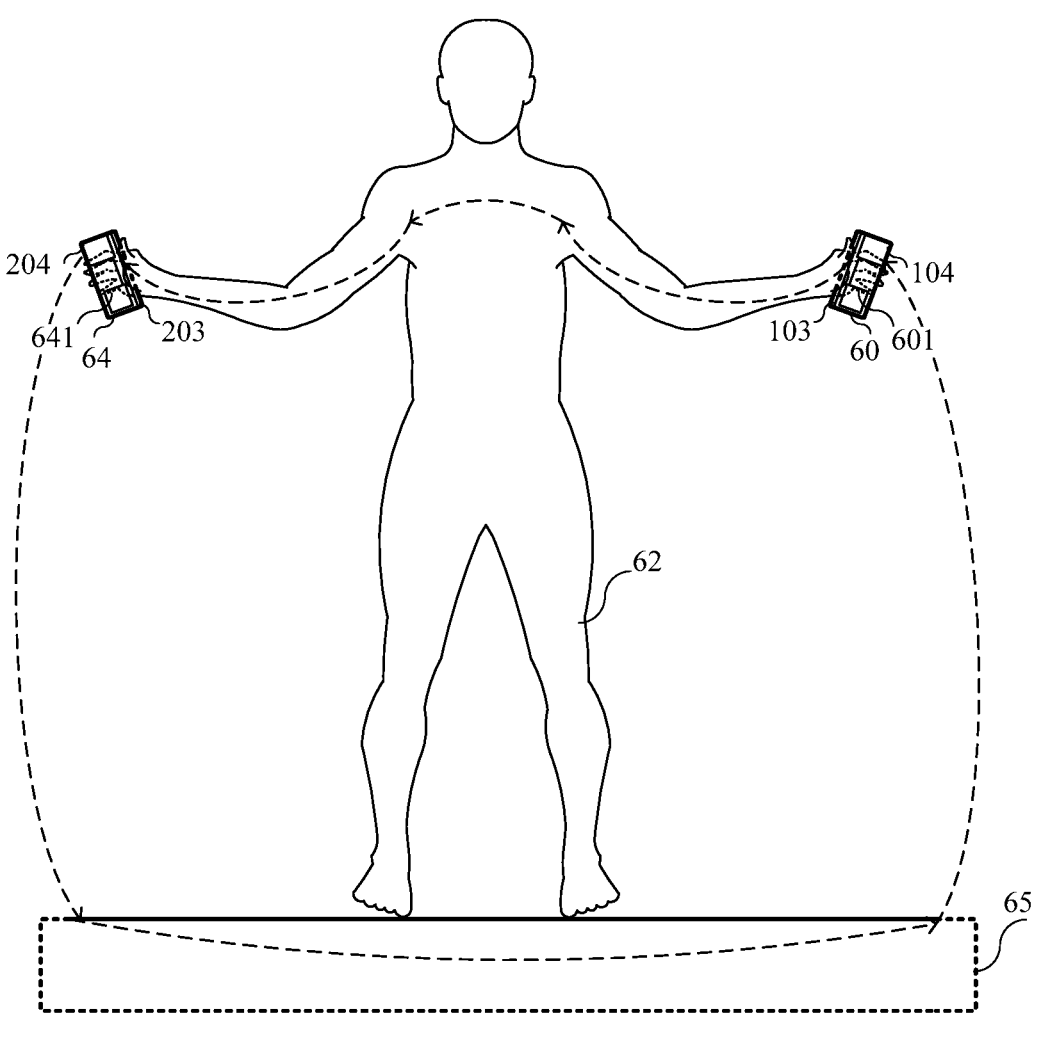
FIG. 18 is a schematic diagram of a fourth type of wireless charging according to an embodiment of this application.
Figure 19:
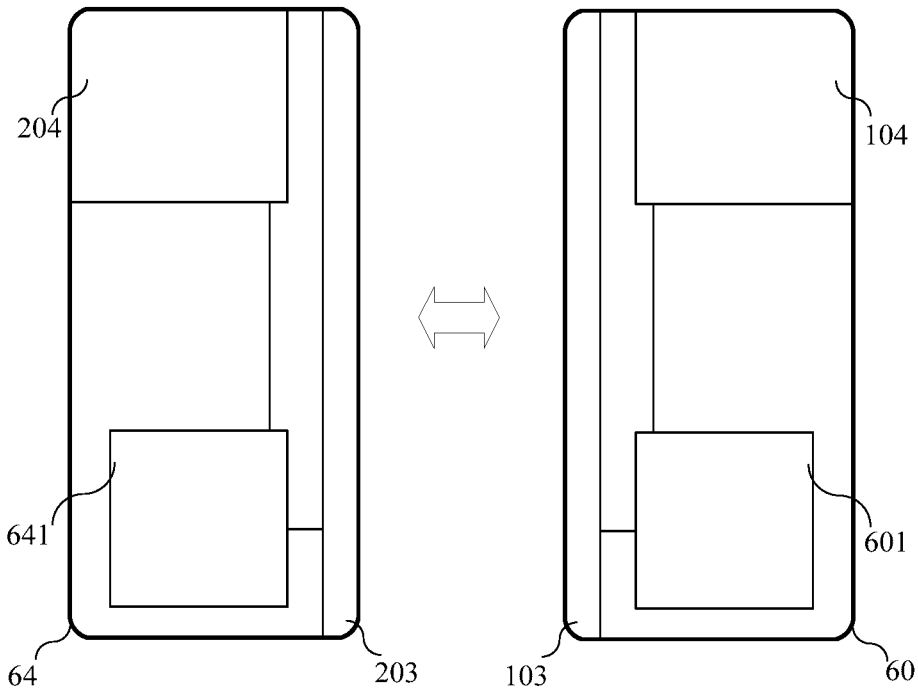
FIG. 19 is a schematic diagram of an internal structure of a fourth apparatus according to an embodiment of this application.

A fourth possible application scenario is as follows:

FIG. 18 and FIG. 19 are schematic diagrams of an application scenario of the wireless charging system provided in the embodiment of FIG. 1, which is specifically an application scenario in which a handheld mobile phone 60 is used to wirelessly charge a handheld electronic device 64 on the other side of a body.

FIG. 18 is a schematic diagram of wireless charging. As shown in FIG. 18, the mobile phone 60 is a transmit apparatus 10, and may include an internal circuit 601 of the transmit apparatus, a transmit electrode 103, and a transmit electrode 104. The internal circuit 601 of the transmit apparatus may include a direct-current power supply 101 and an inverter circuit 102, and may further include a first compensation circuit 105. The handheld electronic device 64 on the other side of the body is a receive apparatus 20, and may include an internal circuit 641 of the receive apparatus, a receive electrode 203, and a receive electrode 204. The internal circuit 641 of the receive apparatus may include a rectifier circuit 201 and a load 202, and may further include a second compensation circuit 205.

When a user 62 holds the mobile phone 60 and holds the electronic device 64 on the other side of the body, the transmit electrode 103 and the receive electrode 203 are coupled through the body of the user 62, to form a power transmission path. The transmit electrode 104 and the receive electrode 204 are coupled through the ground 65 or a grounding metal object, to form another power transmission path. The two power transmission paths form a power loop, so as to implement wireless power transmission.

FIG. 19 is a schematic diagram of an internal structure of an apparatus. As shown in FIG. 19, structures of a mobile phone 60 and an electronic device 64 are similar to the structure of the mobile phone 60 in the foregoing several possible application scenarios. Details are not described again in this embodiment of this application.

Figure 20:
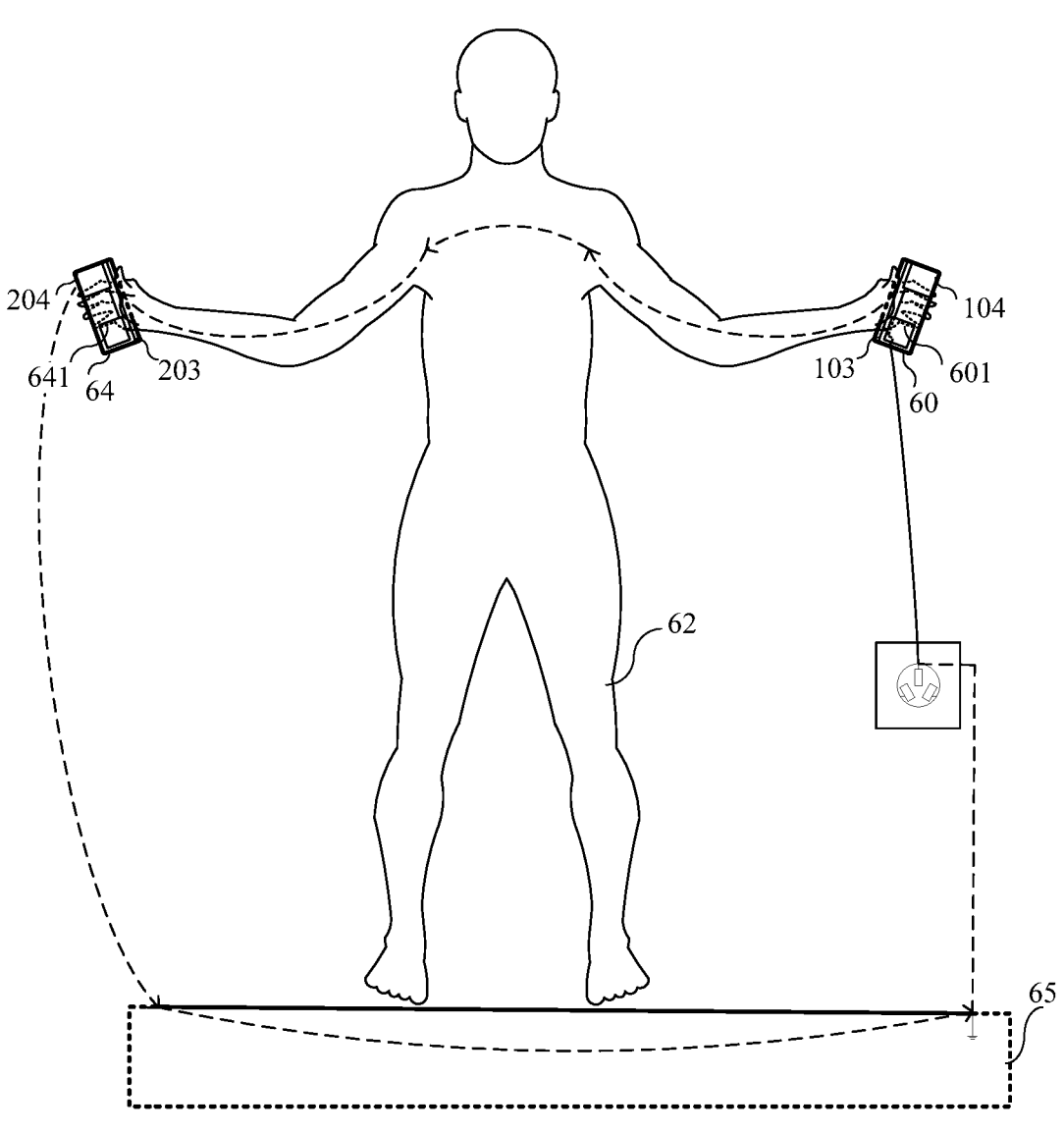
FIG. 20 is a schematic diagram of a fifth type of wireless charging according to an embodiment of this application.
Figure 21:
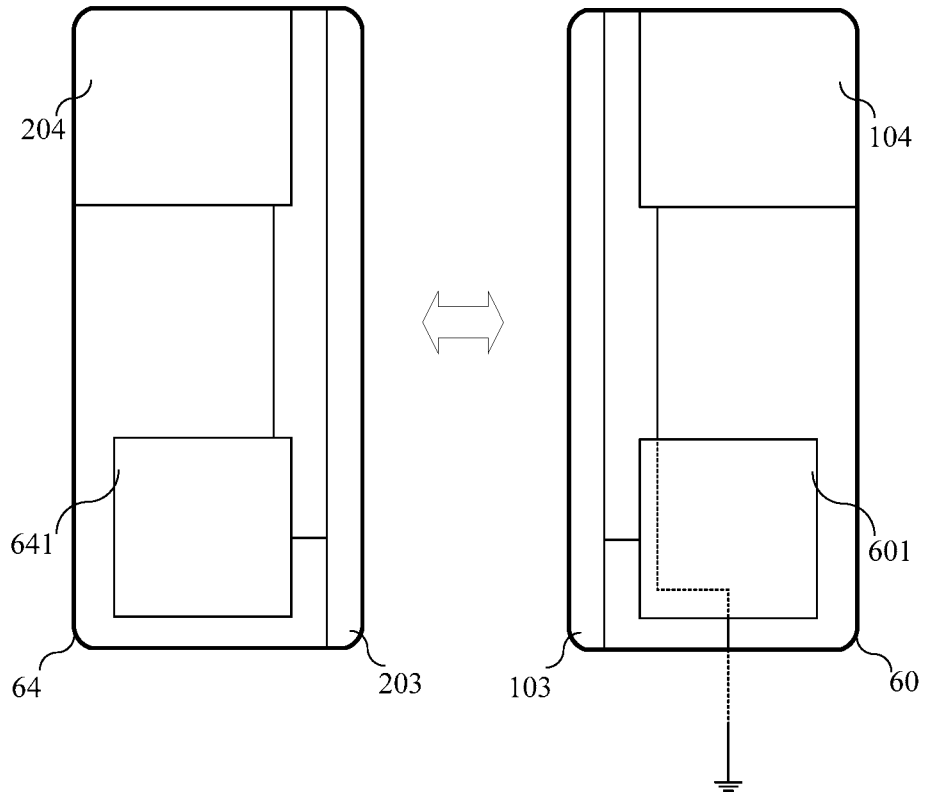
FIG. 21 is a schematic diagram of an internal structure of a fifth apparatus according to an embodiment of this application.

A fifth possible application scenario is as follows:

FIG. 20 and FIG. 21 are schematic diagrams of an application scenario of the wireless charging system provided in the embodiment of FIG. 1, which is specifically an application scenario in which a handheld grounding mobile phone 60 is used to wirelessly charge a handheld electronic device 64 on the other side of a body.

FIG. 20 is a schematic diagram of wireless charging. FIG. 21 is a schematic diagram of an internal structure of an apparatus. As shown in FIG. 20 and FIG. 21, the mobile phone 60 and the electronic device 64 have structures, principles, and working scenarios similar to those of the mobile phone 60 and the electronic device 64 in the fourth possible application scenario. A difference lies in that grounding of the mobile phone 60 is implemented by using a charging cable or a data line, to increase a coupling degree between a transmit electrode 104 and the ground 65 or a grounding metal object, thereby further improving efficiency of wireless power transmission.

Figure 22:
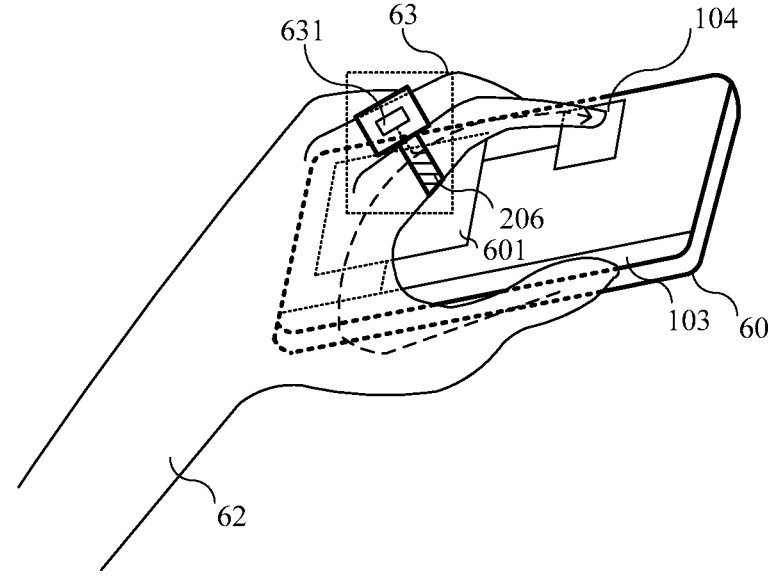
FIG. 22 is a schematic diagram of a sixth type of wireless charging according to an embodiment of this application.
Figure 23:
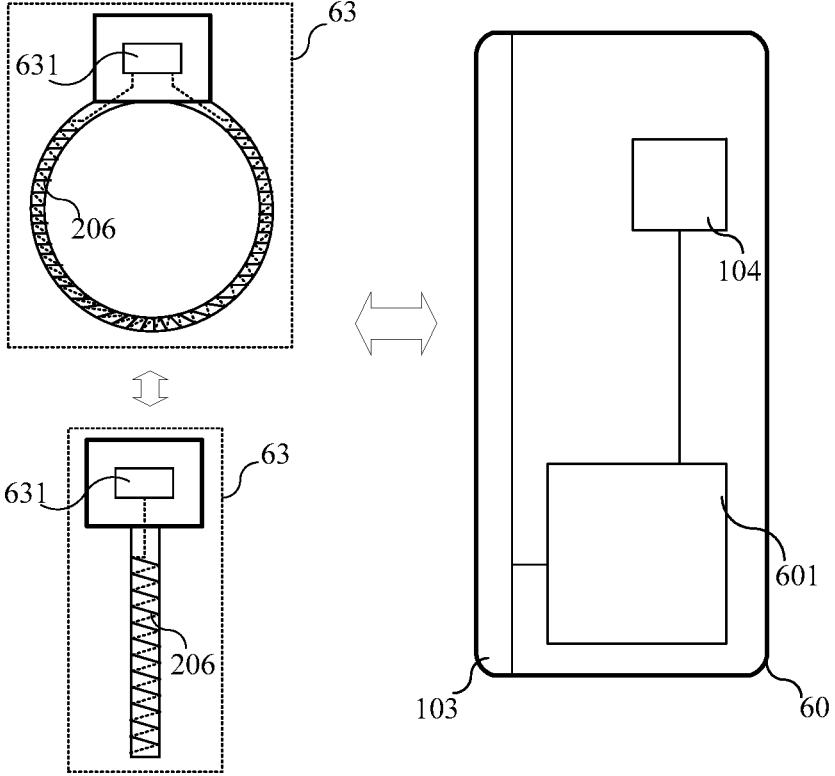
FIG. 23 is a schematic diagram of an internal structure of a sixth apparatus according to an embodiment of this application.

A sixth possible application scenario is as follows:

FIG. 22 and FIG. 23 are schematic diagrams of an application scenario of the wireless charging system provided in the embodiment of FIG. 10, which is specifically an application scenario in which a handheld mobile phone 60 is used to wirelessly charge a smart ring 63 worn on a finger.

FIG. 22 is a schematic diagram of wireless charging. As shown in FIG. 22, the mobile phone 60 is a transmit apparatus 10, and may include an internal circuit 601 of the transmit apparatus, a transmit electrode 103, and a transmit electrode 104. The internal circuit 601 of the transmit apparatus may include a direct-current power supply 101 and an inverter circuit 102, and may further include a first compensation circuit 105. The smart ring 63 is a receive apparatus 20, and may include an internal circuit 631 of the receive apparatus and a receive coil 206. The internal circuit 631 of the receive apparatus may include a rectifier circuit 201 and a load 202, and may further include a second compensation circuit 205.

When a user 62 holds the mobile phone 60 and wears the smart ring 63 on a finger, a palm comes in contact with the transmit electrode 103 and a finger comes in contact with the transmit electrode 104. The finger and the palm are connected to the transmit electrode 103 and the transmit electrode 104 respectively, to form a current path. A current in the finger excites a magnetic field. The receive coil 206 in the smart ring 63 generates an alternating current under the action of the magnetic field, so as to implement wireless power transmission.

FIG. 23 is a schematic diagram of an internal structure of an apparatus. As shown in FIG. 23, a structure of a mobile phone 60 is similar to the structure of the mobile phone 60 in the foregoing several possible application scenarios. A difference lies in that locations of a transmit electrode 103 and a transmit electrode 104 in the mobile phone 60 should facilitate an operation of the palm and the finger wearing the smart ring 63 to come in contact with the transmit electrode 103 and the transmit electrode 104 respectively.

The receive coil 206 in the smart ring 63 may be at least a portion of a ring of the smart ring 63, and the receive coil 206 may be formed by winding a conducting wire such as a copper wire or a litz wire.

Figure 24:
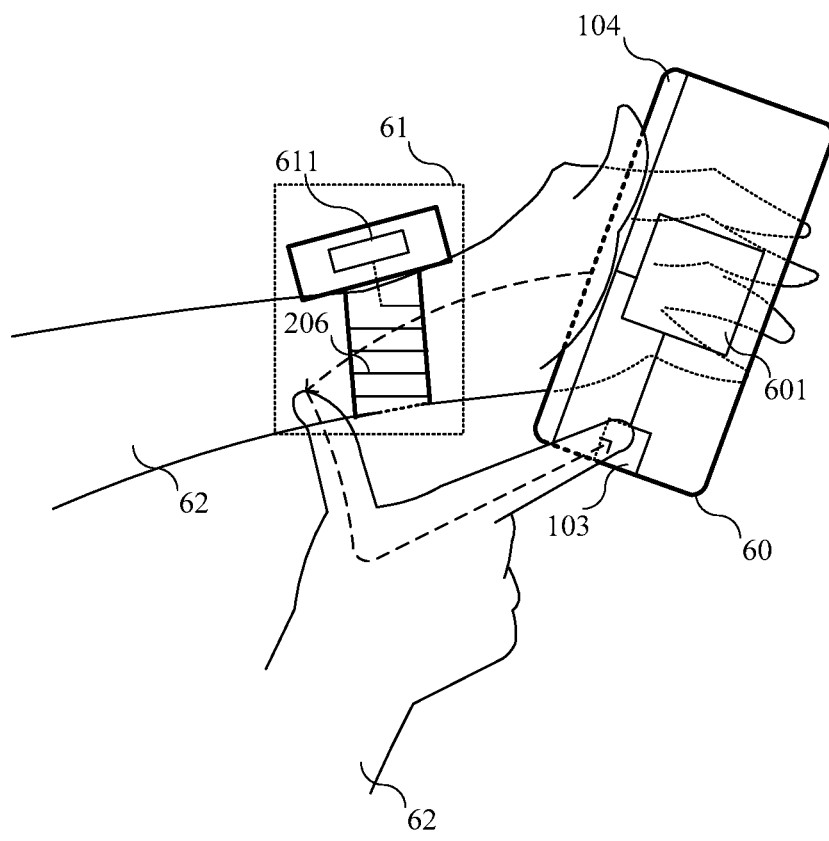
FIG. 24 is a schematic diagram of a seventh type of wireless charging according to an embodiment of this application.
Figure 25:
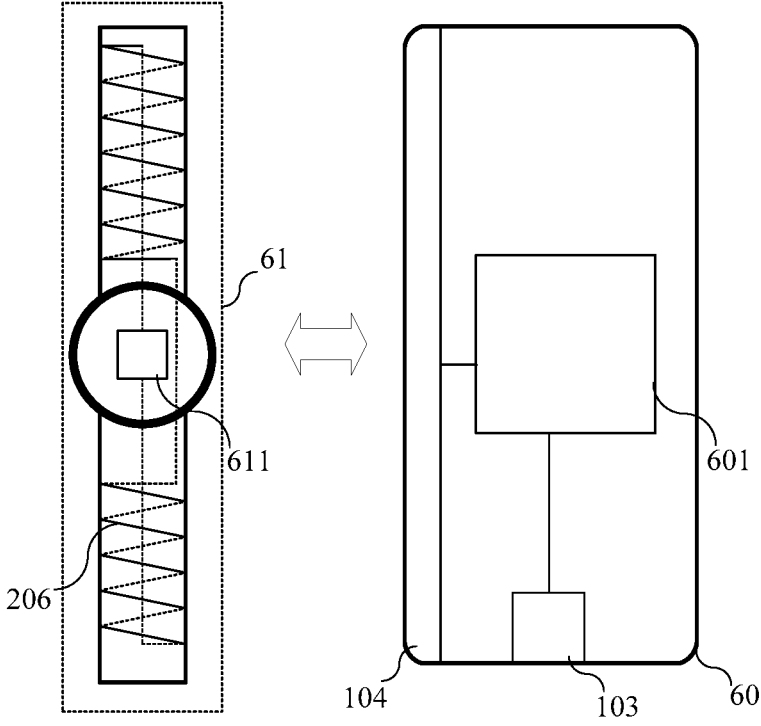
FIG. 25 is a schematic diagram of an internal structure of a seventh apparatus according to an embodiment of this application.

A seventh possible application scenario is as follows:

FIG. 24 and FIG. 25 are schematic diagrams of an application scenario of the wireless charging system provided in the embodiment of FIG. 10, which is specifically an application scenario in which a handheld mobile phone 60 is used to wirelessly charge a smart watch 61 worn on a wrist.

FIG. 24 is a schematic diagram of wireless charging. As shown in FIG. 24, the mobile phone 60 is a transmit apparatus 10, and may include an internal circuit 601 of the transmit apparatus, a transmit electrode 103, and a transmit electrode 104. The internal circuit 601 of the transmit apparatus may include a direct-current power supply 101 and an inverter circuit 102, and may further include a first compensation circuit 105. The smart watch 61 is a receive apparatus 20, and may include an internal circuit 611 of the receive apparatus and a receive coil 206. The internal circuit 611 of the receive apparatus may include a rectifier circuit 201 and a load 202, and may further include a second compensation circuit 205.

When a user 62 holds the mobile phone 60 and wears the smart watch 61 on the wrist, an index finger of the other hand comes in contact with the transmit electrode 103 and a thumb of the other hand comes in contact with an arm on a side of the smart watch 61 away from the mobile phone 60. The transmit electrode 103 and the transmit electrode 104 form a current path through a body of the user 62. A current in the arm excites a magnetic field. The receive coil 206 in the smart watch 61 generates an alternating current under the action of the magnetic field, so as to implement wireless power transmission.

FIG. 25 is a schematic diagram of an internal structure of an apparatus. As shown in FIG. 25, a structure of a mobile phone 60 is similar to the structure of the mobile phone 60 in the foregoing several possible application scenarios. A difference lies in that a location of a transmit electrode 103 in the mobile phone 60 should facilitate an operation by an index finger of the other hand.

The receive coil 206 in the smart watch 61 may be at least a portion of a watch band of the smart watch 61, and the receive coil 206 may be formed by winding a conducting wire such as a copper wire or a litz wire.

Figure 26:
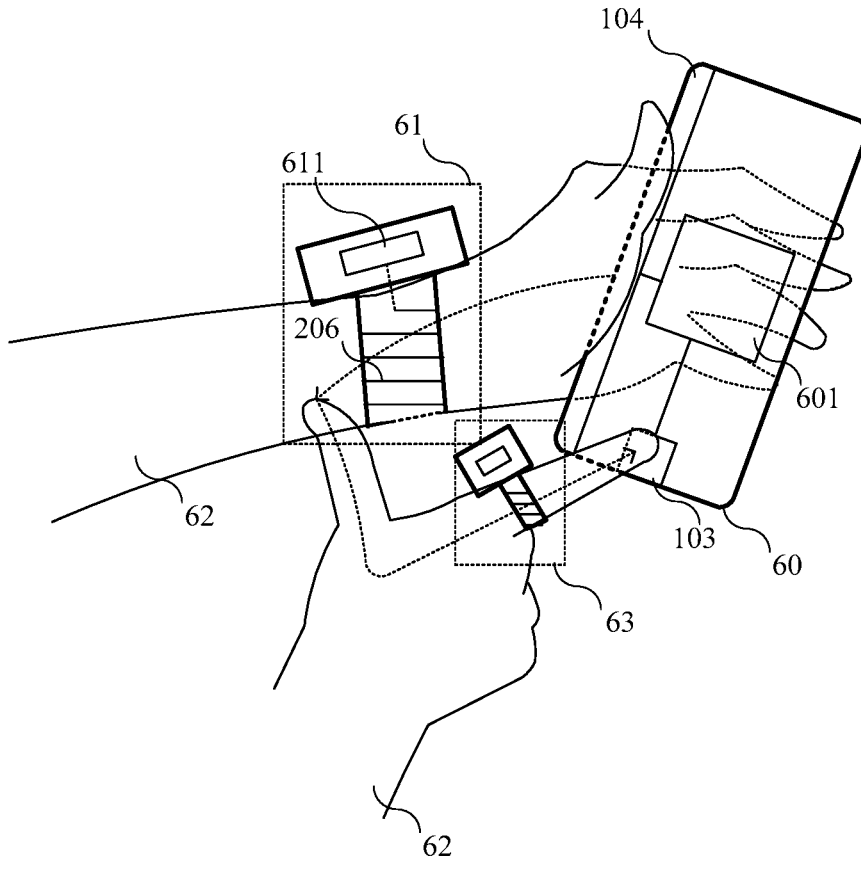
FIG. 26 is a schematic diagram of an eighth type of wireless charging according to an embodiment of this application.

It should be noted that the sixth possible application scenario can be combined with the seventh possible application scenario. FIG. 26 is a schematic diagram of wireless charging by combining the sixth possible application scenario and the seventh possible application scenario.

Figure 27:
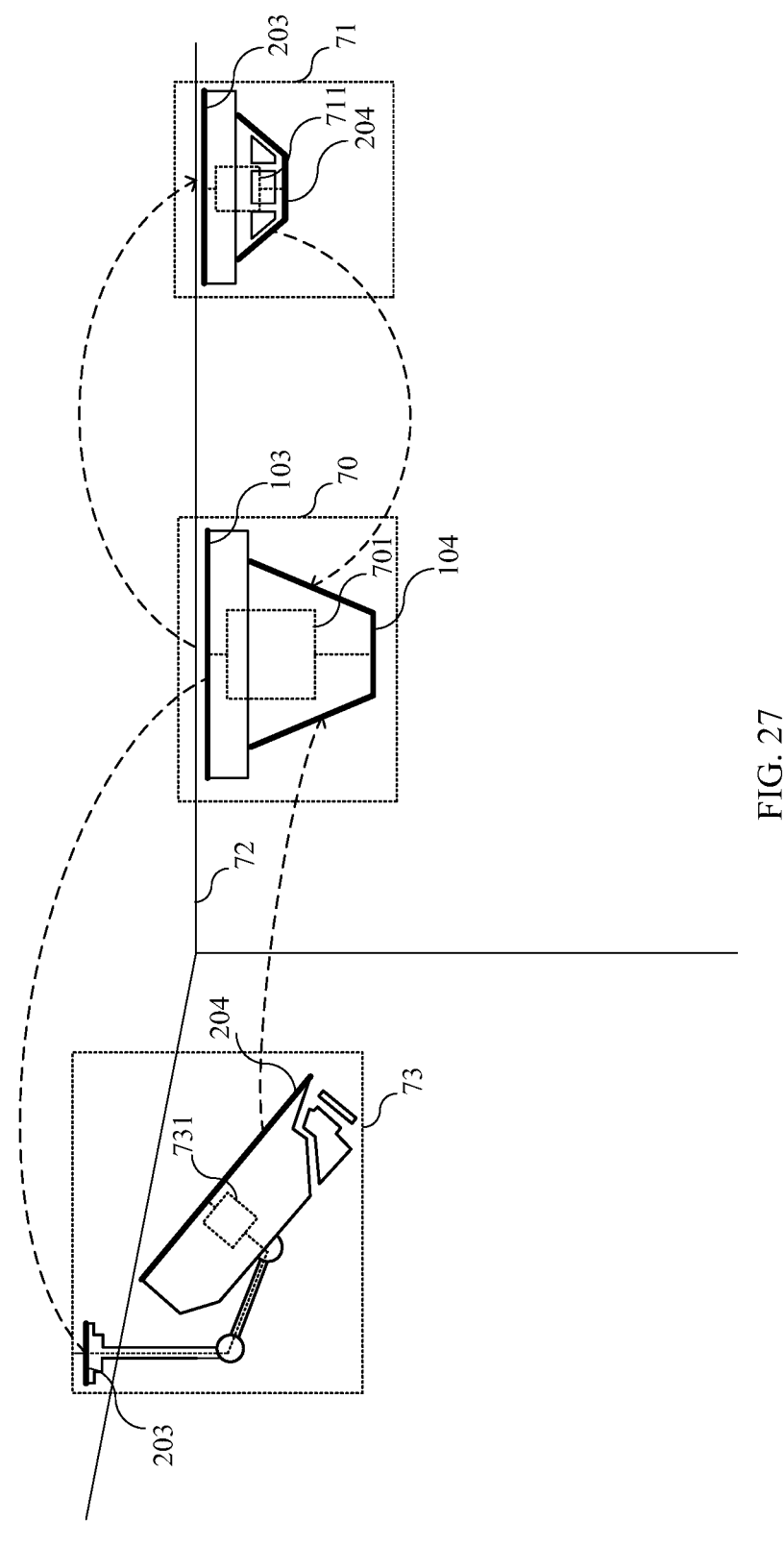
FIG. 27 is a schematic diagram of a ninth type of wireless charging according to an embodiment of this application.
Figure 28:
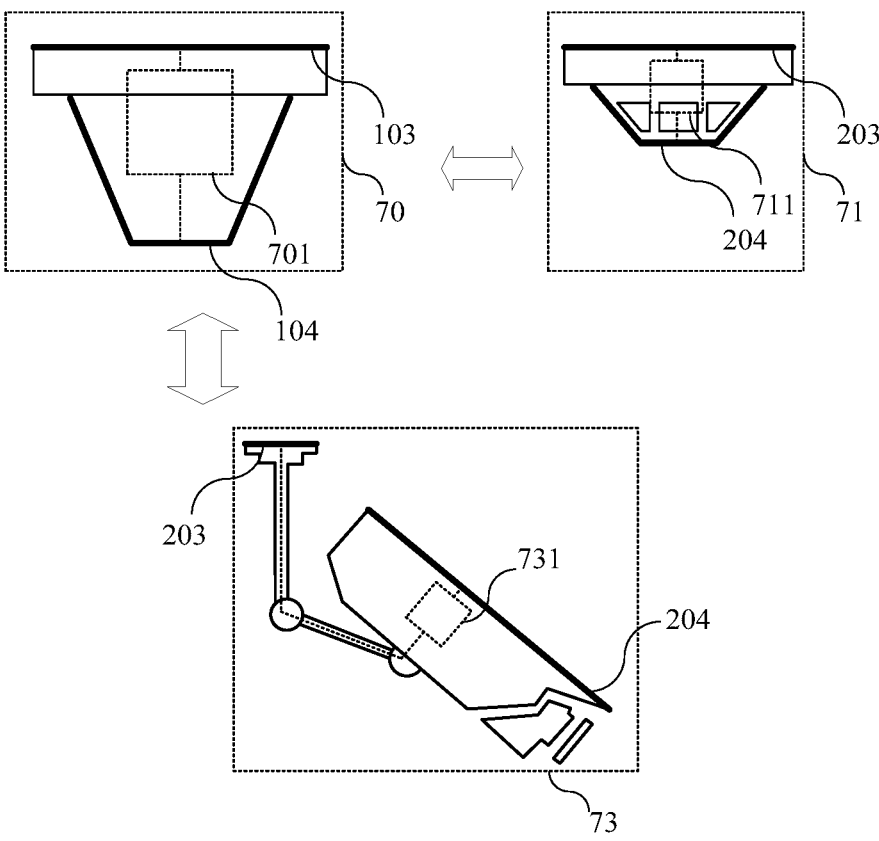
FIG. 28 is a schematic diagram of an internal structure of an eighth apparatus according to an embodiment of this application.

An eighth possible application scenario is as follows:

FIG. 27 and FIG. 28 are schematic diagrams of an application scenario of the wireless charging system provided in the embodiment of FIG. 1, which is specifically an application scenario in which a power transmit apparatus 70 hung on a roof is used to wirelessly charge a smoke sensor 71 or monitor 73 hung on the roof.

FIG. 27 is a schematic diagram of wireless charging. As shown in FIG. 27, the power transmit apparatus 70 is a transmit apparatus 10, and may include an internal circuit 701 of the transmit apparatus, a transmit electrode 103, and a transmit electrode 104. The internal circuit 701 of the transmit apparatus may include a direct-current power supply 101 and an inverter circuit 102, and may further include a first compensation circuit 105. The smoke sensor 71 is a receive apparatus 20, and may include an internal circuit 711 of the receive apparatus, a receive electrode 203, and a receive electrode 204. The internal circuit 711 of the receive apparatus may include a rectifier circuit 201 and a load 202, and may further include a second compensation circuit 205.

When the power transmit apparatus 70 and the smoke sensor 71 are hung on a roof 72 with a steel structure (such as a steel bar or a steel frame), the transmit electrode 103 and the receive electrode 203 are coupled through the steel structure of the roof 72, to form an energy transmission path. The transmit electrode 104 and the receive electrode 204 are coupled through the air, to form another power transmission path. The two power transmission paths form a power loop, so as to implement wireless power transmission.

FIG. 28 is a schematic diagram of an internal structure of an apparatus. As shown in FIG. 28, the transmit electrode 103 in the power transmit apparatus 70 may be metal foil, metal mesh, or the like, and is disposed at a location, inside or on a surface of the power transmit apparatus 70, corresponding to a contact part between the power transmit apparatus 70 and the roof 72. To increase a coupling degree between the transmit electrode 103 and the steel structure of the roof 72, a directly-opposite area between the transmit electrode 103 and the steel structure of the roof 72 can be maximized by setting an area and a shape of the transmit electrode 103. The transmit electrode 103 may not need to be directly connected electrically to the steel structure of the roof 72. To be specific, an insulating material may be added between the transmit electrode 103 and the steel structure of the roof 72, or the transmit electrode 103 may be spaced some distance apart from the steel structure of the roof 72. The transmit electrode 104 and the transmit electrode 103 in the power transmit apparatus 70 may be made of a same material or different materials, and the transmit electrode 104 may be disposed inside or on a surface of the power transmit apparatus 70 on a side away from the roof 72. To enhance a coupling degree between the transmit electrode 104 and the receive electrode 204, an area of the transmit electrode 104 should be maximized, and a directly-opposite area between the transmit electrode 104 and the transmit electrode 103 should be reduced, so as to reduce a coupling degree between the transmit electrode 104 and the transmit electrode 103.

The receive electrode 203 in the smoke sensor 71 may be metal foil, metal mesh, or the like, and is disposed at a location, inside or on a surface of the power transmit apparatus 70, corresponding to a contact part between the smoke sensor 71 and the roof 72. To increase a coupling degree between the receive electrode 203 and the steel structure of the roof 72, a directly-opposite area between the receive electrode 203 and the steel structure of the roof 72 can be maximized by setting an area and a shape of the receive electrode 203. The receive electrode 203 may not need to be directly connected electrically to the steel structure of the roof 72. To be specific, an insulating material may be added between the receive electrode 203 and the steel structure of the roof 72, or the receive electrode 203 may be spaced some distance apart from the steel structure of the roof 72. The receive electrode 204 and the receive electrode 203 in the smoke sensor 71 may be made of a same material or different materials, and the receive electrode 204 may be disposed inside or on a surface of the smoke sensor 71 on a side away from the roof 72. To enhance a coupling degree between the receive electrode 204 and the transmit electrode 104, an area of the receive electrode 204 should be maximized, and a directly-opposite area between the receive electrode 204 and the receive electrode 203 should be reduced, so as to reduce a coupling degree between the receive electrode 204 and the receive electrode 203.

It should be noted that a principle and a structure for wirelessly charging the monitor 73 hung on the roof by the power transmit apparatus 70 are similar to the principle and the structure for wirelessly charging the smoke sensor 71 by the power transmit apparatus 70. Details are not described again in this embodiment of this application.

Figure 29:
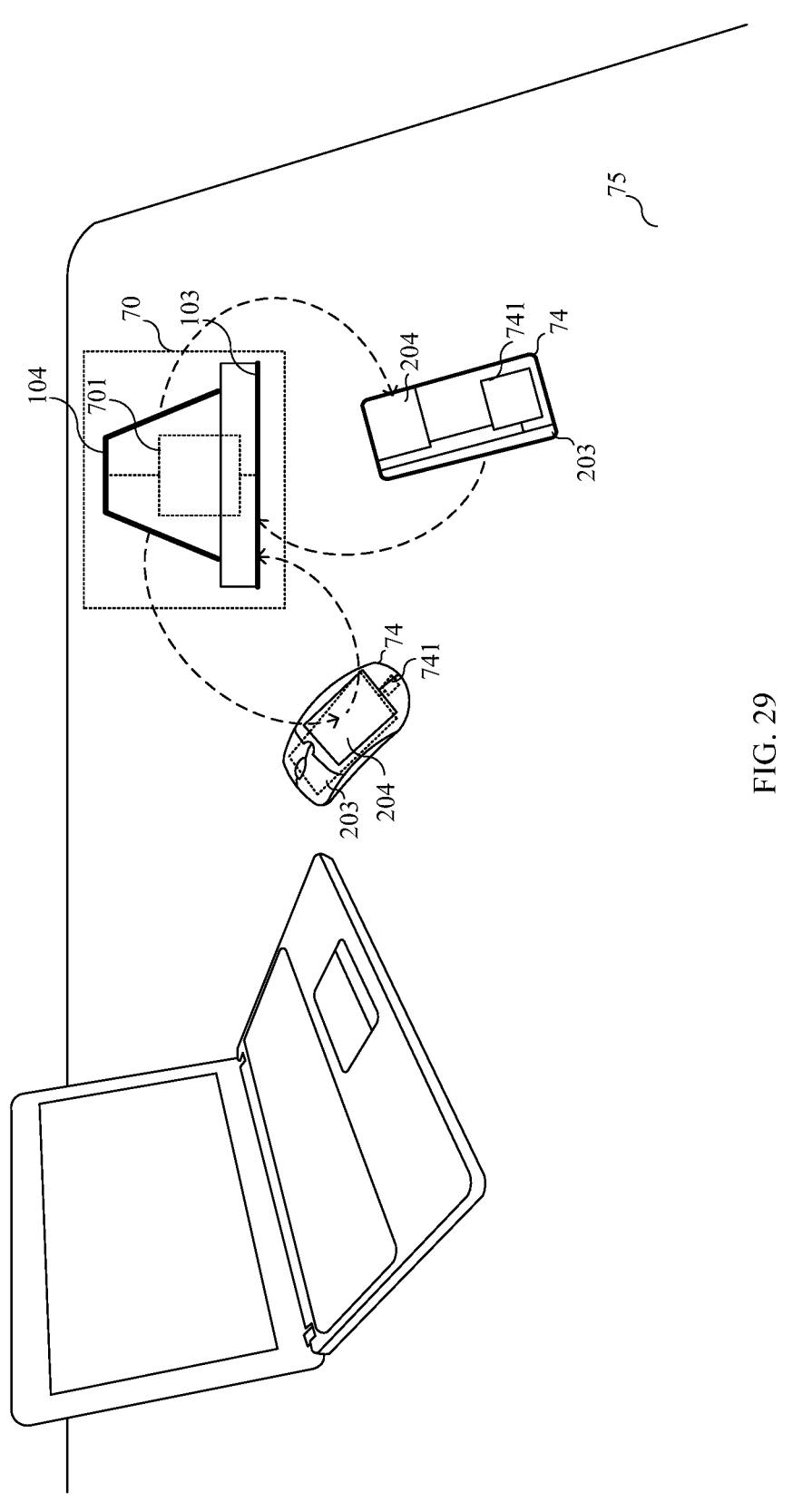
FIG. 29 is a schematic diagram of a tenth type of wireless charging according to an embodiment of this application.

A ninth possible application scenario is as follows:

FIG. 29 is a schematic diagram of an application scenario of the wireless charging system provided in the embodiment of FIG. 1, which is specifically an application scenario in which a power transmit apparatus 70 placed on a desk is used to wirelessly charge an electronic device 74 placed on a desk.

FIG. 29 is a schematic diagram of wireless charging. As shown in FIG. 29, the power transmit apparatus 70 is a transmit apparatus 10, and may include an internal circuit 701 of the transmit apparatus, a transmit electrode 103, and a transmit electrode 104. The internal circuit 701 of the transmit apparatus may include a direct-current power supply 101 and an inverter circuit 102, and may further include a first compensation circuit 105. The electronic device 74 is a receive apparatus 20, and may include an internal circuit 741 of the receive apparatus, a receive electrode 203, and a receive electrode 204. The internal circuit 741 of the receive apparatus may include a rectifier circuit 201 and a load 202, and may further include a second compensation circuit 205.

In a possible case, a top surface of a desk may be covered with a metal layer 75. When the power transmit apparatus 70 and the electronic device 74 are placed on the desk covered with the metal layer 75, the transmit electrode 103 and the receive electrode 203 are coupled through the metal layer 75, to form a power transmission path. The transmit electrode 104 and the receive electrode 204 are coupled through the air, to form another power transmission path. The two power transmission paths form a power loop, so as to implement wireless power transmission. It should be noted that the power transmit apparatus 70 may alternatively be disposed in a portable computer, so as to wirelessly charge the electronic device 74 on the desk by using the portable computer.

In another possible case, an area of a transmit electrode 103 of the power transmit apparatus 70 may be increased, and then the electronic device 74 on the desk is directly placed on the transmit electrode 103 of the power transmit apparatus 70. In this case, the top surface of the desk does not need to be covered with the metal layer 75. Instead, the transmit electrode 103 may also be used as a first transmission medium 30, to directly implement coupling of the transmit electrode 103 and the receive electrode 203. In this case, the transmit electrode 103 and the receive electrode 203 are directly coupled, to form a power transmission path. The transmit electrode 104 and the receive electrode 204 are coupled through the air, to form another power transmission path. The two power transmission paths form a power loop, so as to implement wireless power transmission.

Figure 30:
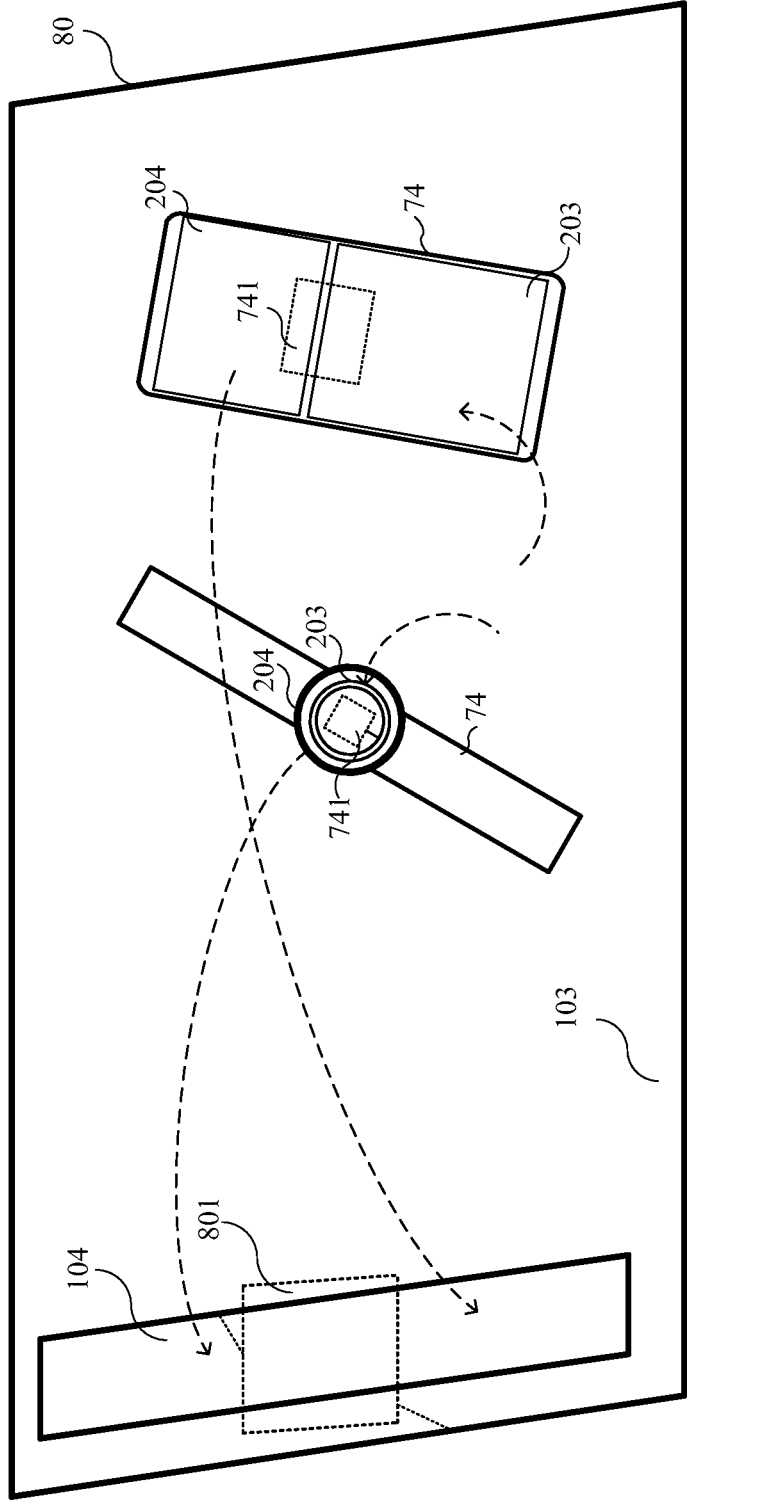
FIG. 30 is a schematic diagram of an eleventh type of wireless charging according to an embodiment of this application.

A tenth possible application scenario is as follows:

FIG. 30 is a schematic diagram of an application scenario of the wireless charging system provided in the embodiment of FIG. 1, which is specifically an application scenario in which a charging pad 80 is used to wirelessly charge an electronic device 74 placed on a desk.

FIG. 30 is a schematic diagram of wireless charging. As shown in FIG. 30, the charging pad 80 is a transmit apparatus 10, and may include an internal circuit 801 of the transmit apparatus, a transmit electrode 103, and a transmit electrode 104. The internal circuit 801 of the transmit apparatus may include a direct-current power supply 101 and an inverter circuit 102, and may further include a first compensation circuit 105. The electronic device 74 is a receive apparatus 20, and may include an internal circuit 741 of the receive apparatus, a receive electrode 203, and a receive electrode 204. The internal circuit 741 of the receive apparatus may include a rectifier circuit 201 and a load 202, and may further include a second compensation circuit 205.

When the electronic device 74 is placed on the transmit electrode 103 of the charging pad 80, compared with that in FIG. 1, the transmit electrode 103 of the charging pad 80 with a relatively large area can also be used as a first transmission medium 30. When there is an insulating material between the transmit electrode 103 and the receive electrode 203, coupling is implemented through air, or when there is no insulating material between the transmit electrode 103 and the receive electrode 203, the transmit electrode 103 and the receive electrode 203 are directly connected electrically, to form a power transmission path. The transmit electrode 104 and the receive electrode 204 are coupled through the air, to form another power transmission path. The two power transmission paths form a power loop, so as to implement wireless power transmission.

The transmit electrode 104 and the transmit electrode 103 may be metal foil, metal mesh, or the like. The transmit electrode 104 and the transmit electrode 103 may be stacked, to obtain a largest effective charging area. The transmit electrode 104 and the transmit electrode 103 may alternatively be placed in parallel without overlapping, to reduce a directly-opposite area between the transmit electrode 104 and the transmit electrode 103, thereby reducing a coupling degree between the transmit electrode 104 and the transmit electrode 103.

Figure 31:
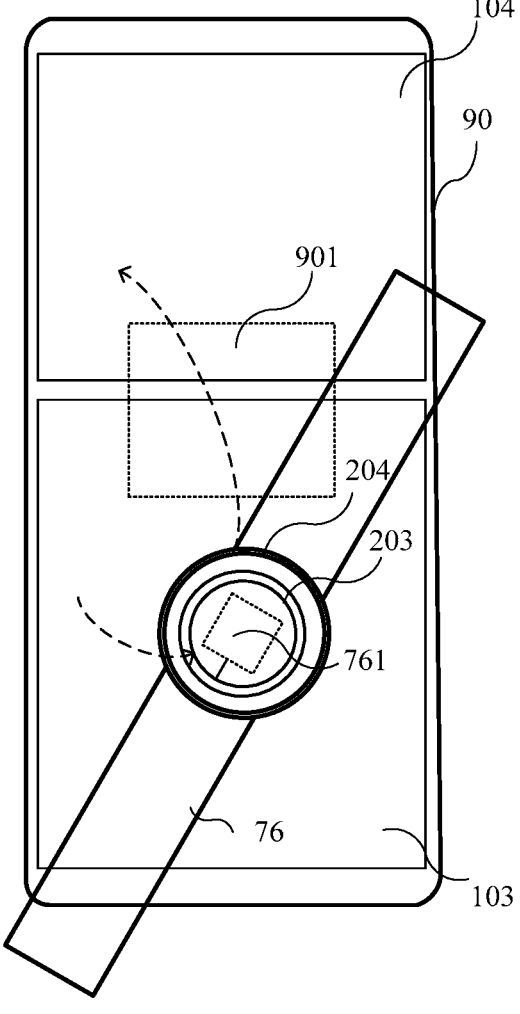
FIG. 31 is a schematic diagram of a twelfth type of wireless charging according to an embodiment of this application.

An eleventh possible application scenario is as follows:

FIG. 31 is a schematic diagram of an application scenario of the wireless charging system provided in the embodiment of FIG. 1, which is specifically an application scenario in which a mobile phone 90 is used to wirelessly charge a smart watch 76.

FIG. 31 is a schematic diagram of wireless charging. As shown in FIG. 31, the mobile phone 90 is a transmit apparatus 10, and may include an internal circuit 901 of the transmit apparatus, a transmit electrode 103, and a transmit electrode 104. The internal circuit 901 of the transmit apparatus may include a direct-current power supply 101 and an inverter circuit 102, and may further include a first compensation circuit 105. The smart watch 76 is a receive apparatus 20, and may include an internal circuit 761 of the receive apparatus, a receive electrode 203, and a receive electrode 204. The internal circuit 761 of the receive apparatus may include a rectifier circuit 201 and a load 202, and may further include a second compensation circuit 205.

When the smart watch 76 is placed on the transmit electrode 103 of the mobile phone 90, compared with that in FIG. 1, the transmit electrode 103 of the mobile phone 90 can also be used as a first transmission medium 30. When there is an insulating material between the transmit electrode 103 and the receive electrode 203, coupling is implemented through air, or when there is no insulating material between the transmit electrode 103 and the receive electrode 203, the transmit electrode 103 and the receive electrode 203 are directly connected electrically, to form a power transmission path. The transmit electrode 104 and the receive electrode 204 are coupled through the air, to form another power transmission path. The two power transmission paths form a power loop, so as to implement wireless power transmission.

It should be noted that the smart watch 76 may be placed on the transmit electrode 103 of the mobile phone 90, or may be placed on the transmit electrode 104 of the mobile phone 90, thereby implementing a relatively large effective charging area.

The transmit electrode 104 and the transmit electrode 103 may be metal foil, metal mesh, or the like. The transmit electrode 104 and the transmit electrode 103 may be stacked, to obtain a largest effective charging area. The transmit electrode 104 and the transmit electrode 103 may alternatively be placed in parallel without overlapping, to reduce a directly-opposite area between the transmit electrode 104 and the transmit electrode 103, thereby reducing a coupling degree between the transmit electrode 104 and the transmit electrode 103.

It should be noted that in the embodiments of this application, the foregoing eleven possible application scenarios are used only as examples for description. In actual application, the wireless charging system provided in the embodiments of this application may also be applied to other scenarios requiring wireless charging, thereby implementing good spatial flexibility for wireless charging.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A wireless charging system, wherein the system comprises:

a transmit apparatus comprising an inverter circuit and two transmit electrodes, an input terminal of the inverter circuit is connected to a direct-current power supply and two output terminals of the inverter circuit are connected to the two transmit electrodes respectively; and a receive apparatus comprising two receive electrodes and a rectifier circuit, two input terminals of the rectifier circuit are connected to the two receive electrodes respectively and an output terminal of the rectifier circuit is connected to a load, wherein one transmit electrode of the two transmit electrodes is coupled to one receive electrode of the two receive electrodes through a first transmission medium, and wherein electric conductivity of the first transmission medium is greater than electric conductivity of air;

wherein the two transmit electrodes are coupled through a power transmission medium and are coupled to a receive coil of the receive apparatus through the power transmission medium;

wherein the receive coil generates an alternating current under an action of a magnetic field and transmits the alternating current to the rectifier circuit which converts the alternating current into a direct current and outputs the direct current to the load to supply power to the load; and wherein transmission power between the transmit apparatus and the receive apparatus is directly proportional to an operating frequency of the system, equivalent coupling capacitance between the transmit electrode and the receive electrode, output voltage of the transmit apparatus, and input voltage of the receive apparatus.

2. The system according to claim 1, wherein:

the other transmit electrode of the two transmit electrodes is coupled to the other receive electrode of the two receive electrodes through the air; or the other transmit electrode of the two transmit electrodes is coupled to the other receive electrode of the two receive electrodes through a second transmission medium, wherein electric conductivity of the second transmission medium is greater than the electric conductivity of the air.

3. The system according to claim 1, wherein the transmit apparatus further comprises:

a first compensation circuit, the first compensation circuit is connected between the inverter circuit and the two transmit electrodes, and the first compensation circuit is configured to compensate for capacitive reactance between the transmit apparatus and the receive apparatus.

4. The system according to claim 1, wherein the receive apparatus further comprises:

a second compensation circuit, the second compensation circuit is connected between the two receive electrodes and the rectifier circuit, and the second compensation circuit is configured to compensate for capacitive reactance between the receive apparatus and the transmit apparatus.

5. The system according to claim 1, wherein the one transmit electrode comes into contact with the first transmission medium or a distance between the one transmit electrode and the first transmission medium is greater than 0 and less than a first distance.

6. The system according to claim 1, wherein the one receive electrode comes into contact with the first transmission medium, or a distance between the one receive electrode and the first transmission medium is greater than 0 and less than a second distance.

7. The system according to claim 1, wherein the one transmit electrode is at least a portion of a metal structural part of a wireless charging transmit device in which the transmit apparatus is located or the one transmit electrode is located on an inner side of a housing of the wireless charging transmit device.

8. The system according to claim 1, wherein the one receive electrode is at least a portion of a metal structural part of a wireless charging receive device in which the receive apparatus is located or the one receive electrode is located on an inner side of a housing of the wireless charging receive device.

9. A wireless charging system, comprising:

a transmit apparatus comprising an inverter circuit and two transmit electrodes, an input terminal of the inverter circuit is connected to a direct-current power supply, one output terminal of the inverter circuit is connected to one of the transmit electrodes, and the other output terminal of the inverter circuit is connected to an output terminal of the transmit apparatus; and a receive apparatus comprising one receive electrode and a rectifier circuit, one input terminal of the rectifier circuit is connected to the receive electrode, the other input terminal of the rectifier circuit is connected to an input terminal of the receive apparatus, and an output terminal of the rectifier circuit is connected to a load, wherein the transmit electrode is coupled to the receive electrode through a power transmission medium, and wherein electric conductivity of the power transmission medium is greater than electric conductivity of air;

wherein the two transmit electrodes are coupled to a receive coil of the receive apparatus through another power transmission medium;

wherein the receive coil generates an alternating current under an action of a magnetic field and transmits the alternating current to the rectifier circuit which converts the alternating current into a direct current and outputs the direct current to the load to supply power to the load; and wherein transmission power between the transmit apparatus and the receive apparatus is directly proportional to an operating frequency of the system, equivalent coupling capacitance between the transmit electrode and the receive electrode, output voltage of the transmit apparatus, and input voltage of the receive apparatus.

10. The system according to claim 9, wherein the transmit apparatus further comprises:

a first compensation circuit, the first compensation circuit is connected between the inverter circuit and the transmit electrode, and is connected between the inverter circuit and the output terminal of the transmit apparatus, and the first compensation circuit is configured to compensate for capacitive reactance between the transmit apparatus and the receive apparatus.

11. The system according to claim 9, wherein the receive apparatus further comprises:

a second compensation circuit, the second compensation circuit is connected between the receive electrode and the rectifier circuit, and is connected between the input terminal of the receive apparatus and the rectifier circuit, and the second compensation circuit is configured to compensate for capacitive reactance between the receive apparatus and the transmit apparatus.

12. The system according to claim 9, wherein the transmit electrode comes into contact with the power transmission medium or a distance between the transmit electrode and the power transmission medium is greater than 0 and less than a first distance.

13. The system according to claim 9, wherein the receive electrode comes into contact with the power transmission medium or a distance between the receive electrode and the power transmission medium is greater than 0 and less than a second distance.

14. The system according to claim 9, wherein the transmit electrode is at least a portion of a metal structural part of a wireless charging transmit device in which the transmit apparatus is located or the transmit electrode is located on an inner side of a housing of the wireless charging transmit device.

15. The system according to claim 9, wherein the receive electrode is at least a portion of a metal structural part of a wireless charging receive device in which the receive apparatus is located or the receive electrode is located on an inner side of a housing of the wireless charging receive device.

16. A wireless charging system, wherein the system comprises:

a transmit apparatus comprising an inverter circuit and two transmit electrodes, wherein an input terminal of the inverter circuit is connected to a direct-current power supply and two output terminals of the inverter circuit are connected to the two transmit electrodes respectively; and the two transmit electrodes are coupled through a power transmission medium, wherein electric conductivity of the power transmission medium is greater than electric conductivity of air;

a receive apparatus comprising a receive coil and a rectifier circuit, an input terminal of the rectifier circuit is connected to the receive coil, and an output terminal of the rectifier circuit is connected to a load;

wherein the two transmit electrodes are coupled to the receive coil through the power transmission medium;

wherein the receive coil generates an alternating current under an action of a magnetic field and transmits the alternating current to the rectifier circuit which converts the alternating current into a direct current and outputs the direct current to the load to supply power to the load; and wherein transmission power between the transmit apparatus and the receive apparatus is directly proportional to an operating frequency of the system, equivalent coupling capacitance between the transmit electrode and a receive electrode, output voltage of the transmit apparatus, and input voltage of the receive apparatus.

17. The system according to claim 16, wherein the transmit apparatus further comprises:

a first compensation circuit, the first compensation circuit is connected between the inverter circuit and the two transmit electrodes, and is configured to compensate for capacitive reactance between the two transmit electrodes.

18. The system according to claim 16, wherein the receive apparatus further comprises:

a second compensation circuit, and the second compensation circuit is connected between the receive coil and the rectifier circuit, and is configured to compensate for inductive reactance of the receive coil.

19. The system according to claim 16, wherein: at least one transmit electrode of the two transmit electrodes comes into contact with the power transmission medium;

a distance between at least one transmit electrode of the two transmit electrodes and the power transmission medium is greater than 0 and less than a reference distance; or one transmit electrode of the two transmit electrodes comes into contact with the power transmission medium and a distance between the other transmit electrode and the power transmission medium is greater than 0 and less than a reference distance.

20. The system according to claim 16, wherein:

at least one transmit electrode of the two transmit electrodes is at least a portion of a metal structural part of a wireless charging transmit device in which the transmit apparatus is located;

at least one transmit electrode of the two transmit electrodes is located on an inner side of a housing of the wireless charging transmit device; or one transmit electrode of the two transmit electrodes is at least a portion of a metal structural part of the wireless charging transmit device and the other transmit electrode is located on an inner side of a housing of the wireless charging transmit device.

* * * * *